United States Patent
Saudagar et al.

(10) Patent No.: US 12,287,650 B1
(45) Date of Patent: Apr. 29, 2025

(54) ADAPTIVE SPEED CONTROL FOR LINE-FOLLOWING ROBOTS AND METHOD THEREOF

(71) Applicant: IMAM MOHAMMAD IBN SAUD ISLAMIC UNIVERSITY, Riyadh (SA)

(72) Inventors: Abdul Khader Jilani Saudagar, Riyadh (SA); Safkat Shahrier Swapnil, Rajshahi (BD); Sandip Kumer Sarker, Rajshahi (BD); Arpon Bose Dibya, Rajshahi (BD); Md Tanvir Islam, Suwon (KR); Md. Abu-Talha Roni, Rajshahi (BD); Hitoun A. Alsagri, Riyadh (SA); Khan Muhammad, Seoul (KR)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/964,779

(22) Filed: Dec. 2, 2024

(51) Int. Cl.
  *G05D 1/65* (2024.01)
  *G05D 1/646* (2024.01)
  (Continued)

(52) U.S. Cl.
  CPC ............... *G05D 1/65* (2024.01); *G05D 1/646* (2024.01); *G06V 10/82* (2022.01); *G06V 20/56* (2022.01);
  (Continued)

(58) Field of Classification Search
  CPC ...... G05D 1/65; G05D 1/646; G05D 2101/15; G05D 2107/70; G05D 2111/14; G06V 10/82; G06V 20/56
  (Continued)

(56) References Cited

U.S. PATENT DOCUMENTS

| | | | |
|---|---|---|---|
| 2019/0007674 A1* | 1/2019 | Karvounis | ............... G06T 7/85 |
| 2022/0066456 A1* | 3/2022 | Ebrahimi Afrouzi | ........................ G06F 3/04883 |
| 2024/0184298 A1* | 6/2024 | Crawley | ............. G05D 1/0248 |

FOREIGN PATENT DOCUMENTS

| | | |
|---|---|---|
| CN | 113359703 A | 9/2021 |
| IN | 201811036992 | 10/2018 |

(Continued)

OTHER PUBLICATIONS

Xu et al. (CN 113359703 A) A Mobile Robot Tracking System Suitable For Multiple Complex Paths Date Published Sep. 7, 2021 (Year: 2021).*

(Continued)

*Primary Examiner* — Jorge L Carrasquillo
(74) *Attorney, Agent, or Firm* — Oblon, McClelland, Maier & Neustadt, L.L.P.

(57) ABSTRACT

A line-following robot in an assembly line. The line-following robot includes a microcontroller, a camera connected to the microcontroller, disposed on a front of the line-following robot, and configured to collect line images, an Infrared (IR) sensor array connected to the microcontroller, disposed on the line-following robot, and oriented in a direction of travel of the line-following robot, a first wheel set and a second wheel set disposed opposite one another on opposing sides of a bottom of the line-following robot, and a battery. The microprocessor controls a motor speed of the line-following robot based on an upcoming assembly line by continuously capturing and processing the lines images using an advance image processing technique and computer vision techniques.

16 Claims, 19 Drawing Sheets

(51) Int. Cl.
    *G06V 10/82*     (2022.01)
    *G06V 20/56*     (2022.01)
    *G05D 101/15*     (2024.01)
    *G05D 107/70*     (2024.01)
    *G05D 111/10*     (2024.01)

(52) U.S. Cl.
    CPC ..... *G05D 2101/15* (2024.01); *G05D 2107/70* (2024.01); *G05D 2111/14* (2024.01)

(58) Field of Classification Search
    USPC .................................................. 318/568.13
    See application file for complete search history.

(56) References Cited

FOREIGN PATENT DOCUMENTS

| | | |
|---|---|---|
| IN | 202441049328 | 7/2024 |
| KR | 10-1143892 B1 | 5/2012 |
| KR | 10-2020-0079914 | 7/2020 |

OTHER PUBLICATIONS

Kim et al. (KR 101143892 B1) Automatic Guided Vehicle and Method for Controlling the Same Date Published May 14, 2012 (Year: 2012).*

* cited by examiner

ADAPTIVE SPEED CONTROL FOR LINE-FOLLOWING ROBOTS AND METHOD THEREOF

BACKGROUND

Technical Field

The present disclosure is directed to robotics and automation, and more particularly to a method for controlling speed of a line-following robot in an assembly line by integrating advanced image processing and computer vision techniques.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Line-following robots are autonomous devices designed to navigate predefined paths, typically marked by lines on the ground. These robots have become integral in various industries, including automation, warehouse management, event navigation, and agriculture. By automating repetitive tasks, the robots significantly enhance operational efficiency and serve as valuable educational and research tools, making them useful across both industrial and academic domains.

Conventionally, line-following robots are equipped with either an array of Infrared (IR) sensors or computer vision systems. The IR sensors are responsible for detecting the robot's position relative to the line and adjusting the motor speeds to ensure it stays on course. However, this sensor-based approach has limitations. IR sensors, typically mounted beneath the robot, offer only a narrow view of the line directly below. This restricted vantage point prevents the robot from anticipating upcoming changes in the path, such as sharp turns, intersections, or abrupt shifts, making it challenging to adapt quickly to these variations.

Relying solely on IR sensor data for navigation and speed control introduces additional challenges. The data from IR sensors can be noisy, affecting the robot's ability to maintain a smooth and accurate trajectory. Due to the limited forward visibility, the robot cannot detect the line's shape or direction in advance, complicating navigation at higher speeds. This often results in poor handling during rapid maneuvers or high-speed turns, leading the robot to deviate from its intended path.

A significant challenge for traditional line-following robots lies in their ability to steer accurately at higher speeds, especially when negotiating sharp turns or complex intersections. Overcoming this obstacle is critical for improving their performance and expanding their applications in dynamic and fast-paced environments.

To address the challenges faced by traditional line-following robots, various advanced systems integrating computer vision and enhanced sensor arrays have been developed. One approach integrated a low-cost webcam with an array of IR sensors, using a customized image segregation method to enable navigation along white lines on dark surfaces. This system utilized a webcam, a Data Acquisition Card (DAQ) connected to a CPU, and a laptop for image processing. Although it achieved real-time image processing at 30 frames per second, it struggled with high-speed applications due to processing limitations.

An enhanced vision-controlled robot using a webcam and a Proportional-Integral-Derivative (PID) controller was developed for enhanced image processing techniques. The system applied histogram equalization for contrast enhancement and tested filters like Wiener, Lee, and Kuan to refine image quality. It was evaluated using metrics like Peak Signal-to-Noise Ratio (PSNR), entropy, and image smoothness, proving robust against varying environmental factors such as low lighting, camera distortion, and line color variations. However, due to its computational complexity, it required a laptop for image processing, limiting its portability and suitability for high-speed applications.

Another conventional approach involved using a square-topology IR sensor matrix combined with a neural network for high-speed, low-cost operation. The robot employed three control strategies—neural network-based, learning vector quantization, and reinforcement learning—to anticipate turns and navigate smoothly. With a simple 8-bit microcontroller and just four neurons, this setup effectively followed the track. However, the system could only detect a few inches ahead, and its deep learning methods required higher processing power, reducing its suitability for fast navigation.

A real-time image processing technique was developed using a Raspberry Pi 2 with a Camera Module Version 2, capable of capturing videos at 90 frames per second. By applying the Suzuki85 algorithm, it achieved a processing speed of 6.259 microseconds per frame, enabling higher speeds and improved road element detection. However, the use of servo motor steering introduced complexities and turn delays, and the system struggled with issues related to lighting and variations in line markings.

A vision-based two-wheel self-balancing (TWSB) robot was later introduced, utilizing MATLAB and an IP camera for image processing to follow black line patterns. The robot featured a cascade intelligent motion control system for effective balancing and movement, successfully demonstrating real-time line tracing. However, using a Bluetooth module for integration led to high latency, making the system unsuitable for high-speed applications.

Further advancements included a camera-based line-following robot using Sobel edge detection, comparing the performance of Raspberry Pi and Jetson Nano CPUs. The Jetson Nano achieved 98% accuracy, outperforming the Raspberry Pi's 96%. Despite the high accuracy, the system was bulky and ineffective in low light conditions below 0.7 lumens per square meter.

A deep learning controller was also developed, implemented on an Arduino platform using an ATmega 32 microcontroller. It employed a multilayered feedforward network trained on Keras. This setup demonstrated effective control even with imprecise input data. However, the high execution time of the deep learning model made it unsuitable for high-speed operations.

A multilayer neural network-based control system was developed to outperform traditional PID and fuzzy control algorithms in efficiency and response time. It used analog data from an IR sensor array as input, generating Pulse-Width Modulation (PWM) signals to control the robot's motors for precise path navigation. However, the system lacked detailed implementation results and a thorough performance evaluation, especially when using the Arduino Mega controller, leaving its practical effectiveness unverified.

To enhance functionality, an obstacle avoidance system for multi-robot formations was introduced. It utilized adaptive control, an Extended Kalman Filter (EKF), and feedback to reconfigure paths in response to obstacles dynamically. A leading line-following robot calculated waypoints to coordinate the movement of other robots. However, the system's complexity made implementation and maintenance challenging, and its reliance on precise IR sensor data limited its performance.

Further, a system integrating line sensors, cameras, and adaptive control algorithms was developed for simultaneous line tracking and obstacle avoidance. It used calculated waypoints and a dynamic switching strategy to maintain formation among multiple robots, enabling coordinated movement along a predefined path while effectively navigating obstacles. Despite its advantages, the system's dependency on micro-patterns for line detection and precise control limited its performance in unpredictable environments, particularly those with variable lighting, surface textures, or rapidly changing obstacles.

Based on the above discussed approaches and their challenges, it is evident that current approaches used for developing the line-following robots predominantly rely on a single type of sensing module, such as the IR sensors array or the computer vision techniques. Each of these approaches has inherent limitations, for instance, the IR sensors may struggle with performance under varying lighting conditions or complex line patterns, while the computer vision systems can be computationally intensive and may require significant processing power. As a result, both methods often face challenges in achieving effective speed control, particularly on tracks with inconsistent or intricate line patterns. Moreover, there are few systems that successfully integrate both the IR sensors and computer vision techniques to enhance line-following robots' capabilities, particularly regarding speed control and acceleration performance. However, these systems still present several drawbacks, including complexity, environmental sensitivity, high processing requirements, and cost challenges. Accordingly, to address the deficiencies of conventional line following robots, the present disclosure provides a line following robot capable to anticipate the environments surrounding the line following robot, adjust acceleration proactively, and thereby control the line following robot effectively without the need for heavy resources, such as high processing power and high cost.

SUMMARY

In an exemplary embodiment, a line-following robot in an assembly line is described, comprising: a microcontroller; a camera connected to the microcontroller, disposed on a front of the line-following robot, and configured to collect a plurality of line images; an Infrared (IR) sensor array connected to the microcontroller, disposed on the line-following robot, and oriented in a direction of travel of the line-following robot, wherein the IR sensor array comprises a plurality of sensors facing towards a surface of the assembly line; a first wheel set and a second wheel set, wherein the first wheel set and the second wheel set are disposed opposite one another on opposing sides of a bottom of the line-following robot, wherein each wheel set comprises a single motor having a driving gear mechanically connected to a first wheel having a first driven gear and a second wheel having a second driven gear with a motor of the first wheel set coaxial with a motor of the second wheel set, wherein the first driven gear and the second driven gear have a first radius larger than a second radius of the driving gear, and wherein the driving gear, the first driven gear, and the second driven gear have a co-planar rotation and are in contact through a herringbone pattern; and a battery, wherein the microcontroller is configured to: generate a training image data set from the plurality of line images based on an adaptive image processing technique to train a neural network model configured to predict a line-type of the assembly line; calculate a base speed of the line-following robot based on the line-type; calculate a base position of the line-following robot based on the plurality of sensor data; generate a control signal comprising a plurality of Pulse-Width Modulation (PWM) signals based on the base speed, the base position, and the line-type using a Proportional-Integral-Derivative (PID) algorithm, wherein the control signal is configured to mitigate a positional error of the line-following robot and to adjust a motor speed of each motor of the plurality of motors, and wherein the positional error is estimated based on the base position; and adjusting the speed of each motor of the plurality of motors based on the control signal to thereby control the line-following robot.

In another exemplary embodiment, a method of controlling a line-following robot in an assembly line is described, the line-following robot comprising: a microcontroller, a camera, an Infrared (IR) sensor array, a first wheel set and a second wheel set, each wheel set comprising a single motor mechanically connected to two wheels, the first wheel set and the second wheel set are disposed opposite one another on opposing sides of a bottom of the line-following robot, the method comprising: collecting a plurality of line images from the camera disposed on a front of the line-following robot; generating a training image data set from the plurality of line images based on an adaptive image processing technique to train a neural network model configured to predict a line-type of the assembly line; calculating a base speed of the line-following robot based on the line-type; collecting a plurality of sensor data from the IR sensor array, wherein the IR sensor array is disposed on the line-following robot, and oriented in a direction of travel of the line-following robot, wherein the IR sensor array comprises a plurality of sensors facing towards a surface of the assembly line; calculating a base position of the line-following robot based on the plurality of sensor data; generating a control signal comprising a plurality of Pulse-Width Modulation (PWM) signals based on the base speed, the base position, and the line-type using a Proportional-Integral-Derivative (PID) algorithm, wherein the control signal is configured to mitigate a positional error of the line-following robot and to adjust a motor speed of each motor of the plurality of motors, and wherein the positional error is estimated based on the base position; and adjusting the speed of each motor of the plurality of motors based on the control signal to thereby control the line-following robot, wherein the first wheel set and the second wheel set are disposed opposite one another on opposing sides of a bottom of the line-following robot, wherein each wheel set comprises a single motor having a driving gear mechanically connected to a first wheel having a first driven gear and a second wheel having a second driven gear with a motor of the first wheel set coaxial with a motor of the second wheel set, wherein the first driven gear and the second driven gear have a first radius larger than a second radius of the driving gear, and wherein the driving gear, the first driven gear, and the second driven gear have a co-planar rotation and are in contact through a herringbone pattern.

In another exemplary embodiment, a non-transitory computer readable medium having instructions stored therein that, when executed by one or more processors, cause the one or more processors to perform a method of controlling a line-following robot in an assembly line is described. The line-following robot comprising: a microcontroller, a camera, an Infrared (IR) sensor array, a first wheel set and a second wheel set, each wheel set comprising a single motor mechanically connected to two wheels, the first wheel set and the second wheel set are disposed opposite one another on opposing sides of a bottom of the line-following robot. The method includes collecting a plurality of line images from the camera disposed on a front of the line-following robot. The method includes generating a training image data set from the plurality of line images based on an adaptive image processing technique to train a neural network model configured to predict a line-type of the assembly line. The method includes calculating a base speed of the line-following robot based on the line-type. The method includes collecting a plurality of sensor data from the IR sensor array. The IR sensor array is disposed on the line-following robot, and oriented in a direction of travel of the line-following robot. The IR sensor array includes a plurality of sensors facing towards a surface of the assembly line. The method includes calculating a base position of the line-following robot based on the plurality of sensor data. The method includes generating a control signal including a plurality of Pulse-Width Modulation (PWM) signals based on the base speed, the base position, and the line-type using a Proportional-Integral-Derivative (PID) algorithm. The control signal is configured to mitigate a positional error of the line-following robot and to adjust a motor speed of each motor of the plurality of motors. The positional error is estimated based on the base position. The method includes adjusting the speed of each motor of the plurality of motors based on the control signal to thereby control the line-following robot. The first wheel set and the second wheel set are disposed opposite one another on opposing sides of a bottom of the line-following robot. Each wheel set includes a single motor having a driving gear mechanically connected to a first wheel having a first driven gear and a second wheel having a second driven gear with a motor of the first wheel set coaxial with a motor of the second wheel set. The first driven gear and the second driven gear have a first radius larger than a second radius of the driving gear. The driving gear, the first driven gear, and the second driven gear have a co-planar rotation and are in contact through a herringbone pattern.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
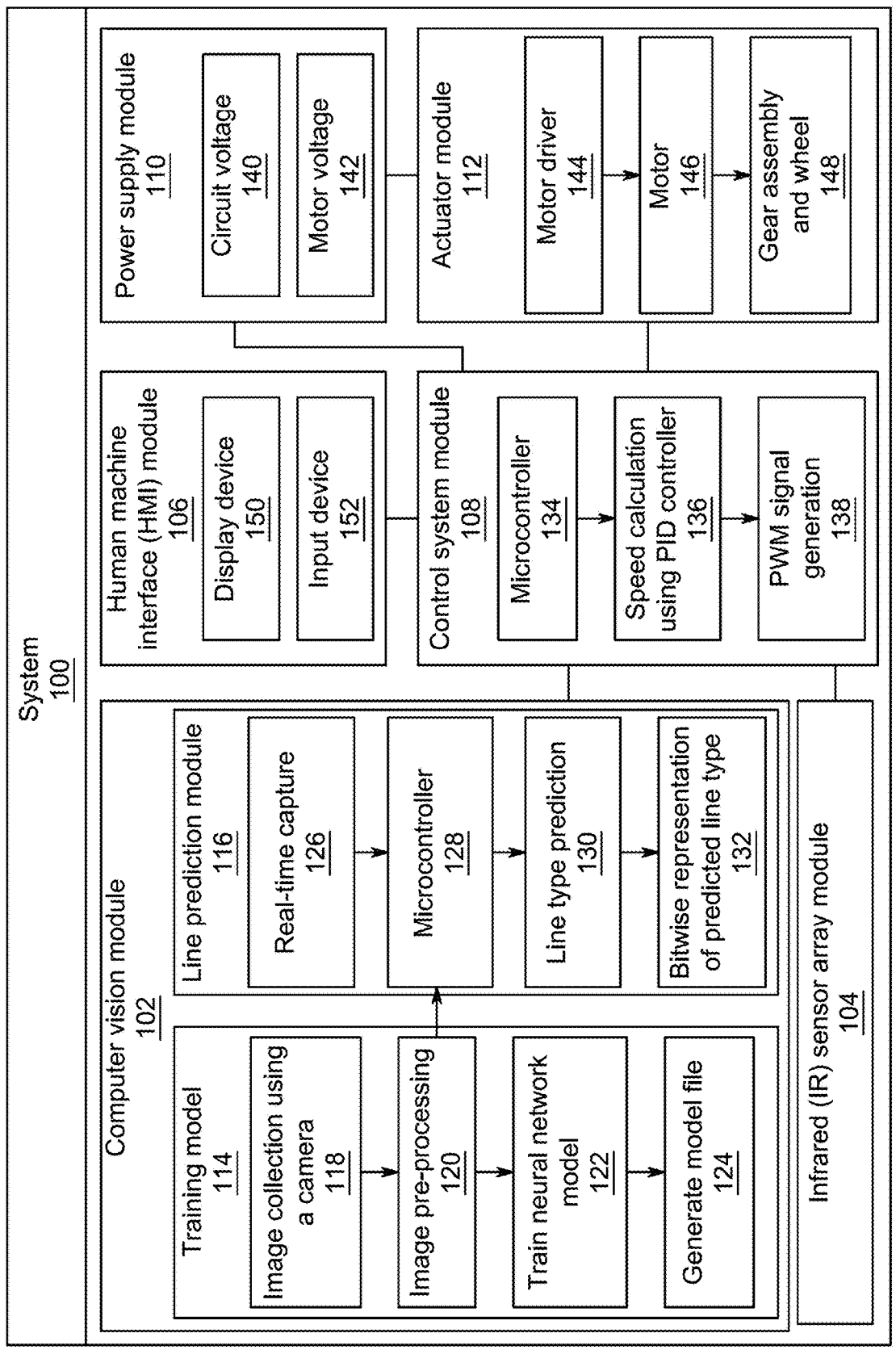
FIG. 1 is an exemplary block diagram of a system depicting an integration of a neural network model with an Infrared (IR) sensor array in a line-following robot, according to certain embodiments.

In the drawings, like reference numerals designate identical or corresponding parts throughout the several views.

Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a line-following robot in an assembly line and a method of controlling thereof. The line-following robot of the present disclosure is a combination of an Infrared (IR) sensor array with computer vision techniques (also referred to as image processing techniques). The IR sensor array ensures that the line-following robot stays on the assembly line (also referred to as a track), while the computer vision techniques anticipate a type of line ahead. By combining data from both the IR sensor array and a front-mounted camera, which continuously captures frames, the present disclosure is capable of handling the speed of the line-following robot more effectively by leveraging long-range information. This combined data enables anticipation of the type of the line ahead and adjusts acceleration proactively, resulting in highly effective speed control.

Referring to FIG. 1, an exemplary block diagram of a system 100 depicting an integration of a neural network model with an IR sensor array in a line-following robot is illustrated, according to certain embodiments. The system 100 includes a computer vision module 102, an IR sensor array module 104, a Human Machine Interface (HMI) module 106, a control system module 108, a power supply module 110, and an actuator module 112. The computer vision module 102 further includes a training model 114 and a line prediction module 116. The training model 114 may correspond to a neural network model that is pre-trained with a plurality of line images. Examples of the neural network model may include, but are not limited to, a Support Vector Classification (SVC) model, a Convolution Neural Network (CNN) model, a Recurrent Neural Network (RNN) model, a feed-forward neural network model, a deep reinforcement learning model, a Generative Adversarial Network (GAN) model, and a Self-Organizing Map (SOM). The plurality of line images may include straight-line images, dotted-line images, intersecting-line images, branched-line images, images of lines with sharp turns, images of lines with acute turns, images of lines with mild curves, images of lines with sharp curves, and the like.

Initially, the training model 114 is configured to collect the plurality of line images using a camera as mentioned via step 118. The camera may be disposed on a front of the line following robot. Once the plurality of line images is captured, at step 120, each of the plurality of line images may be pre-preprocessed to remove noise (such as variations in pixel intensity, salt-and-pepper noise, poisson noise, impulse noise, chromatic noise, etc.) from each of the plurality of line images. The pre-processing of each of the plurality of images may be done based on adaptive image processing techniques. Examples of the adaptive image processing techniques may include, but are not limited to, an Adaptive Histogram Equalization (AHE) image processing technique, an Otsu's thresholding technique, an adaptive denoising image processing technique, an adaptive bilateral filtering image processing technique, a region-based segmentation image processing technique, an adaptive edge detection image processing technique, and an adaptive color correction image processing technique. The plurality of line images may be preprocessed to generate a training image data set from the plurality of line images. Once the training data set is generated, at step 122, the training data set may be provided as an input to the neural network model for training the neural network model to predict a line type of the assembly line. The assembly line may correspond to a track or a path that needs to be followed by the line-following robot. Further, at step 124, the neural network model is configured to generate a model file based on the processing of the training data set. In an embodiment, the model file generated by the neural network model may include an architecture of the neural network model (e.g., layer configurations and activation functions), learned weights and biases from training, and hyperparameters (e.g., a learning rate, a batch size, a margin width, a number of epochs, a dropout rate, etc.) used during a training process of the neural network model.

Further, at step 126, the line prediction module 116 is configured to capture a real-time line image of the assembly line associated with the line-following robot, while the line-following robot is in motion. The real-time line image may be captured using the camera disposed at the front of the line-following robot. The camera may be communicatively coupled with the line prediction module. The real-time line image is provided as an input to a microcontroller (e.g., a Raspberry Pi Pico microcontroller) connected to the camera, as mentioned via step 128. The microcontroller is configured to use the training model 114, i.e., the neural network model to process the real-time line image to determine the line type of a line in the real-time line image. Once the line type of the line present in the real-time line image is predicted, as mentioned in step 130, at step 132, a pre-defined bitwise representation (e.g., a three-bits representation) of the line may be generated based on the predicted line type. The three-bits representation generated for the predicted line type allows the line-following robot to efficiently encode and distinguish between multiple types of lines of the assembly line. Upon generating the three bits representation for the predicted line type, the three-bits line representation is further provided as an input to the control system module 108.

In an embodiment, the IR sensor array module 104 includes an IR sensor array. The IR sensor array is disposed on the line-following robot, and oriented in a direction of travel of the line-following robot. The IR sensor array includes a plurality of sensors facing towards a surface of the assembly line. The plurality of sensors includes a plurality of IR light reflection switches evenly spaced on an arc-shaped Printed Circuit Board (PCB). The arc-shaped PCB is further depicted and explained in detail in conjunction with FIG. 8. The arc-shaped PCB has a diameter of curvature substantially the same as a length of the line-following robot. Further, the plurality of sensors of the IR sensor array is configured to collect data (also referred to as a plurality of sensor data) associated with the assembly line. The plurality of sensor data may include surface condition data (such as rough surface, smooth surface, light surface, dark surface, solid lines, dashed lines, etc.) associated with the surface of the assembly line to be followed by the line-following robot, position data (such as left, right, center) of the line-following robot, and the like.

Once the plurality of sensor data is collected by the IR sensor array module 104, the IR sensor array module 104 is configured to send the plurality of sensor data to the control system module 108. Upon receiving the input, i.e., the three-bits representation of the predicted line type and the plurality of sensor data from the computer vision module 102 and the IR sensor array module 104, the control system module 108 is configured to process the input to generate a control signal for the line-following robot. In particular, initially, at step 134, a microcontroller (e.g., an Arduino mega mini microcontroller (Atmega 2560, manufactured by Microchip Technology 2355 West Chandler Blvd. Chandler, Arizona, United States of America)) is configured to receive the input. Upon receiving the input, at step 136, the microcontroller is configured to determine a base position of the line-following robot based on the input. The base position is a starting position of the line-following robot. Once the base position is determined, the microcontroller is configured to calculate a base speed of the line-following robot based on the line-type, i.e., the predicted line type. The base speed of the line-following robot corresponds to a starting speed of the line-following robot. The base speed of the line-following robot is determined using a Proportional-Integral-Derivative (PID) algorithm. Once the base position and the base speed is determined, at step 138, the microcontroller is configured to generate a control signal corresponding to the line-following robot. The control signal includes a plurality of Pulse-Width Modulation (PWM) signals based on the base speed, the base position, and the line-type. The control signal is configured to mitigate a positional error of the line-following robot and to adjust a motor speed of each motor of a plurality of motors. In an embodiment, the plurality of PWM signals includes a first PWM signal and a second signal. The plurality of motors includes a left motor and a right motor. The first pulse-width modulation signal is configured to adjust a left motor speed of the left motor, and the second pulse-width modulation signal is configured to adjust a right motor speed of the right motor.

The control system module 108 is configured to send the generated control signal to the power supply module 110 and the actuator module 112. The power supply module 110 is configured to manage the power distribution to different components of the line-following robot. In particular, the power supply module 110 is configured to generate and supply voltage to various circuit components, such as the microcontroller, the plurality of sensors, as mentioned via step 140. In addition, the power supply module 110 is configured to generate and supply voltage to various the left motor, the right motor, etc., of the line-following robot, as mentioned via step 142. Further, the power supply module 110 is configured to generate and supply the voltage to the left motor and the right motor of the actuator module 112 based on the control signal received from the control system module 108.

Further, the actuator module 112 is configured to receive the control signal from the control system module 108 and the voltage supply from the power supply module 110. In particular, at step 144, a motor driver is configured to receive the control signal and the voltage supply to adjust the speed of each motor, i.e., the left motor and the right motor mentioned at step 146. In other words, the motor driver controls the direction and speed of each of the left motor and the right motor by adjusting the voltage and the current supplied to the left motor and the right motor. The motor driver adjusts the speed of the left motor and the right motor to allow the line-following robot to move forward, backward, or turn, depending on the control signal it receives from the control system module 108. The motor generates rotational motion for driving wheels (i.e., a first wheel set and a second wheel set) of the line-following robot. The driving wheels include driven gears (i.e., a first driven gear and a second driven gear) for increasing torque and adjust the rotational speed of the driving wheels as mentioned via step 148.

Further, the line-following robot includes the HMI module 106. The HMI module 106 is configured to enable user interaction with the line-following robot via a display device as mentioned via step 150. The display device may be an Organic Light Emitting Diode (OLED) display that facilitates the user interaction with the line-following robot. The OLED display device displays important information, such as the plurality of sensor data and the predicted line-type, allowing the user (i.e., the operator) to monitor and adjust the performance of the line-following robot. Further, the HMI module 106 includes an input device (e.g., push buttons) as mentioned via step 152. The push buttons are configured to enable the operator to calibrate the plurality of sensors, a start time or a stop time of the line-following robot, and the like.

Figure 2:
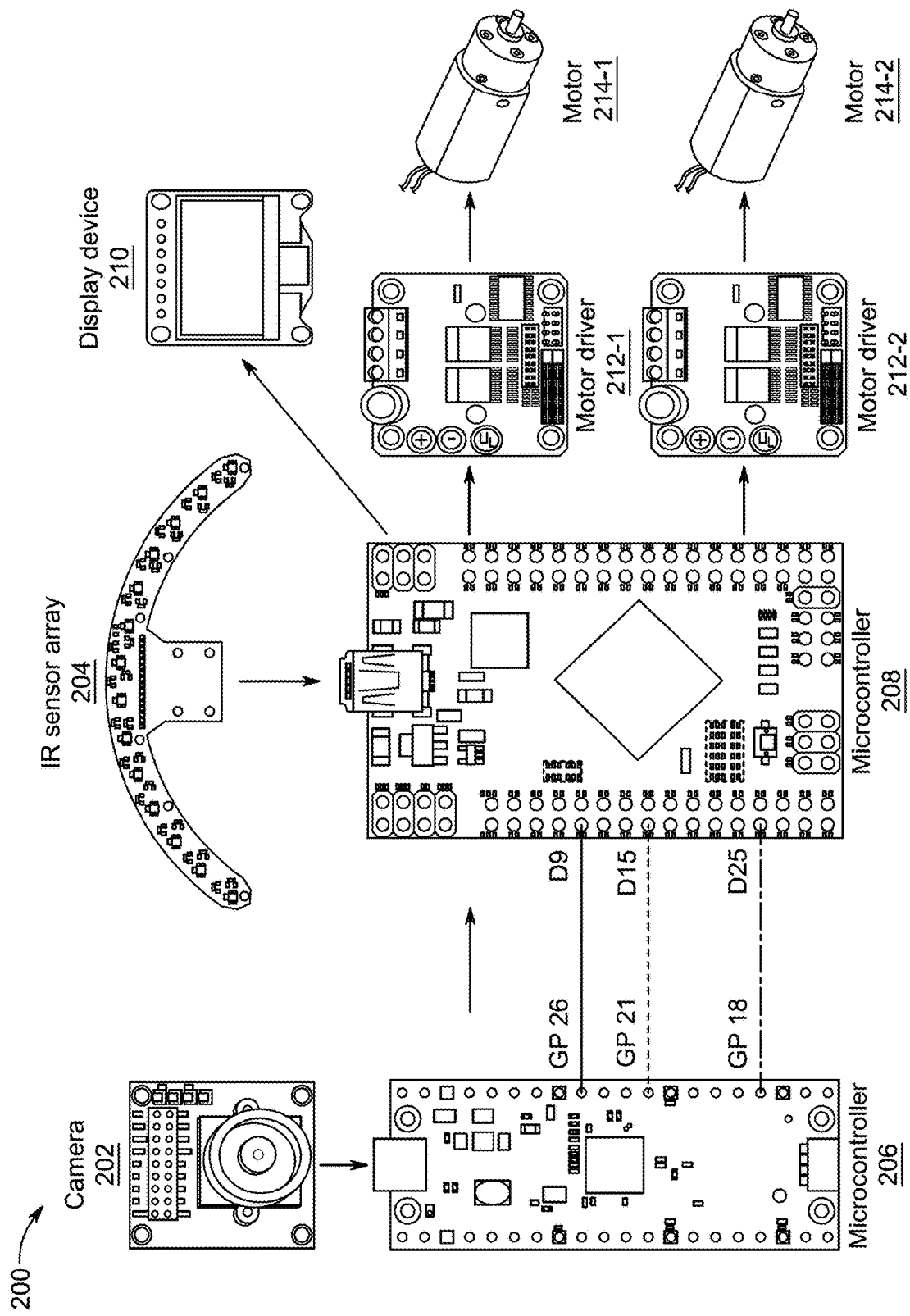
FIG. 2 is an exemplary diagram depicting various components of the line-following robot, according to certain embodiments.

Referring to FIG. 2, the present disclosure further provided an exemplary diagram 200 depicting various components of the line-following robot, according to certain embodiments. The various components of the line-following robot include a camera 202, an IR sensor array 204, a microcontroller 206, a microcontroller 208, a display device 210, a motor driver 212-1, a motor driver 212-2, a motor 214-1, and a motor 214-2. The motor driver 212-1 and the motor driver 212-2 may be collectively referred to as a motor driver 212. The motor 214-1 and the motor 214-2 may be collectively referred to as a motor 214.

The camera 202 is disposed on the front of the line-following robot. Camera 202 is configured to capture a plurality of images of the assembly line. In particular, the camera 202 is configured to capture the plurality of line images while the line-following robot is in motion. The camera 202 may correspond to, for example, an OmniVision (OV) camera (e.g., an OV 7670 camera). The plurality of line images may include straight-line images, dotted-line images, intersecting-line images, branched-line images, images of lines with sharp turns, images of lines with acute turns, images of lines with mild curves, images of lines with sharp curves, and the like. Further, the camera 202 is configured to provide the plurality of line images to the microcontroller 206.

The microcontroller 206 may correspond to the Raspberry Pi Pico microcontroller. The microcontroller 206 is configured to process the plurality of line images to predict the line-type of the assembly line. In particular, the microcontroller 206 is configured to process the plurality of line images to predict the line-type of the assembly line while the line-following robot is in motion. To predict the line-type of the assembly line, the microcontroller 206 is configured to utilize the neural network model to predict the line-type of the assembly line. Examples of the neural network model include, but is not limited to, the SVC model, the CNN model, the RNN model, the feed-forward neural network model, the deep reinforcement learning model, the GAN model, and the SOM. Once the line-type of the assembly line is predicted, the line-type is converted into a corresponding bitwise representation (e.g., the three-bits representation). Once the corresponding bitwise representation is generated, the microcontroller 206 is configured to transfer information, i.e., a line-type information and the three-bits representation of the assembly line to the microcontroller 208.

The microcontroller 206 may transfer the information to the microcontroller 208 via an associated set of General-Purpose Input Output (GPIO) pins. As depicted in FIG. 2, the associated set of GPIO pins may correspond to a GP 26 pin, a GP 21 pin, and a GP 18 pin. Further, the microcontroller 208 may receive the information from the microcontroller 206 via an associated set of digital pins, e.g., a D 9 pin, a D 15 pin, and a D 25 pin. The GP 26 pin, the GP 21 pin, and the GP 18 pin of the microcontroller 206 may be mapped with the D 9 pin, the D 15 pin, and the D 25 pin, respectively, to transfer the information. For example, the microcontroller 208 may correspond to the Arduino mega mini microcontroller. Upon receiving the information, the microcontroller 208 may be configured to calculate the base speed of the line-following robot based on the line-type. The base speed of the line-following robot corresponds to the starting speed of the line-following robot. The base speed of the line-following robot is determined using the PID algorithm. Further, the microcontroller 208 is configured to receive the plurality of sensor data from the IR sensor array 204. The plurality of sensor data may include the surface condition data (such as the rough surface, the smooth surface, the light surface, the dark surface, the solid lines, the dashed lines, etc.) associated with the surface of the assembly line to be followed by the line-following robot, the position data (such as left, right, center) of the line-following robot, and the like. The IR sensor array 204 includes the plurality of sensors facing toward the surface of the assembly line. The IR sensor array 204 is disposed on the line-following robot and oriented in the direction of travel of the line-following robot. Upon receiving the plurality of sensor data, the microcontroller 208 is configured to calculate the base position of the line-following robot based on the plurality of sensor data. The base position is the starting position of the line-following robot. Once the base speed and the base position of the line-following robot is calculated, the microcontroller 208 is configured to generate the control signal corresponding to the line-following robot. The control signal includes the plurality of PWM signals generated based on the base speed, the base position, and the line-type. The control signal is configured to mitigate the positional error of the line-following robot and to adjust the motor speed of each motor of the plurality of motors. The positional error is estimated based on the base position. In other words, a PWM signal of the plurality of PWM signals is used to control the speed and the direction of each motor of the line-following robot, allowing for precise management of the speed and the direction, which is vital for effective navigation of the line-following robot along the assembly line. Further, based on the generated control signal, the microcontroller 208 is configured to adjust the speed of each motor of the plurality of motors to thereby control the line-following. In an embodiment, the plurality of PWM signals includes the first PWM signal and the second PWM signal. The plurality of motors includes the left motor and the right motor. The first PWM signal is configured to adjust the left motor speed of the left motor, and the second PWM signal is configured to adjust the right motor speed of the right motor. In addition to generating the control signal, the microcontroller 208 is configured to detect a finish line of the assembly line based on the plurality of sensor data. Once the finish line is detected, the microcontroller 208 is configured to adjust the control signal to stop an operation of the line-following robot.

In particular, the control signal generated by the microcontroller 208 is transmitted to each motor driver, i.e., the motor driver 212-1 and the motor driver 212-2 to adjust the speed of a corresponding motor of the plurality of motors. The corresponding motor may be one of the motor 214-1 (e.g., the left motor) or the motor 214-2 (e.g., the right motor). For example, the motor driver 212-1 and the motor driver 212-2 is configured adjust the speed of the motor 214-1 and the motor 214-2, respectively. The motor driver 212 may be, for example, a Bipolar Transistor Switch 7960 (for example, BTS7960, manufactured by Infineon Technologies, 101 N Sepulveda Blvd, United States of America) motor driver. In other words, the microcontroller 208 serves as a primary control unit to drive each motor 214 using the corresponding BTS7960 motor driver. Further, the microcontroller 208 is configured to display the status information of the line following robot via the display device 210. The display device 210 may be the OLED display that facilitates the user interaction with the line-following robot. The OLED display renders important information, such as the plurality of sensor data and the predicted line-type, allowing the users to monitor and adjust the performance of the line-following robot.

Figure 3:
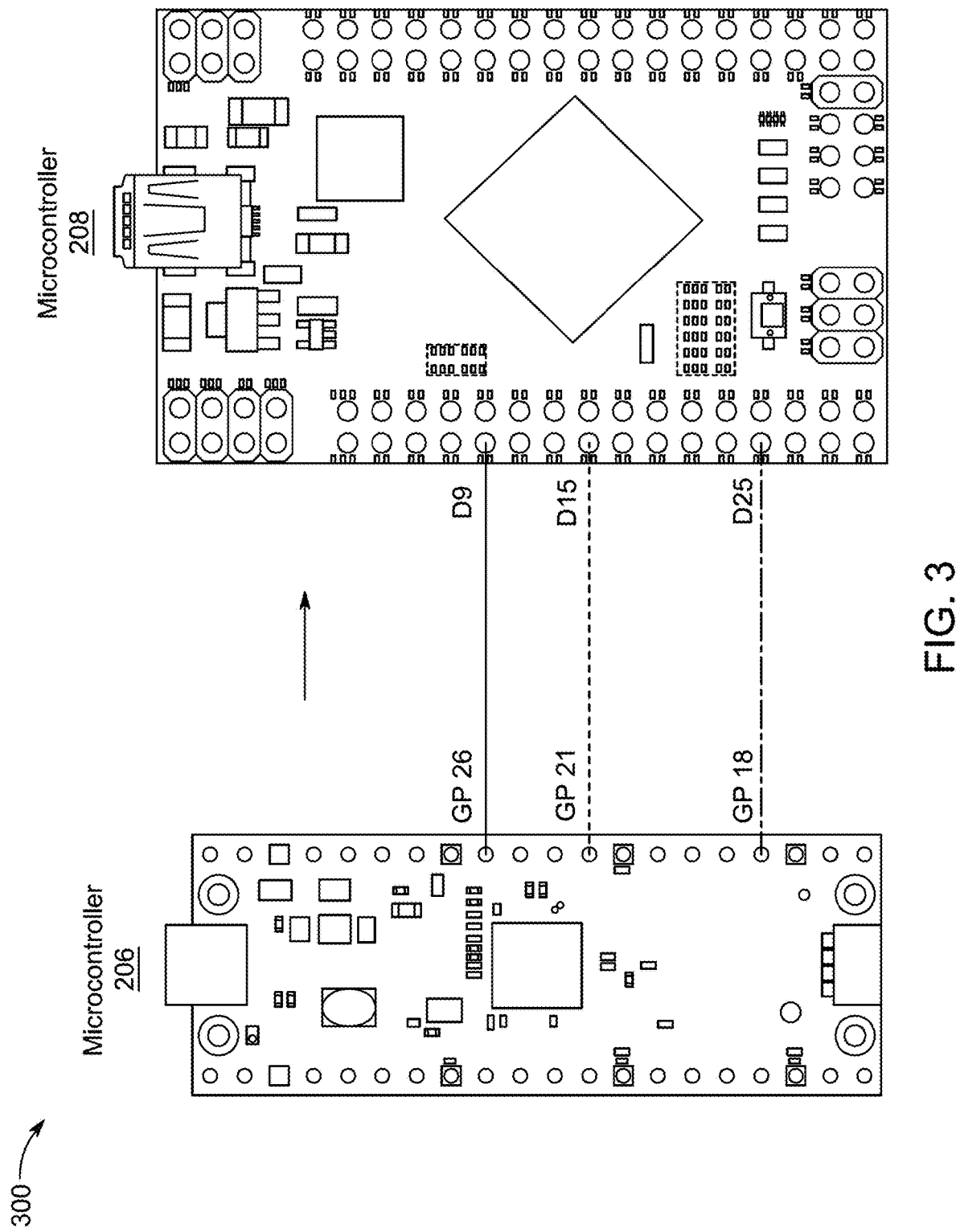
FIG. 3 is an exemplary representation of a bitwise data transfer between two microcontrollers, according to certain embodiments.

Referring to FIG. 3, the present disclosure further provides an exemplary representation 300 of a bitwise data transfer between two microcontrollers, according to certain embodiments. The two microcontrollers may correspond to the microcontroller 206 (e.g., Raspberry Pi Pico microcontroller, developed by Raspberry Pi Ltd, 548 Market Street PMB 16362, San Francisco, CA 94104, United States of America) and the microcontroller 208 (e.g., Arduino mega mini microcontroller developed by 10 St. James Ave., Flr 11, Boston, MA 02116, United States of America). The bitwise data transfer between the microcontroller 206 and the microcontroller 208 includes transferring of bitwise representation, i.e., three-bits representation of the predicted line type of the assembly line.

This bitwise data transfer between the two microcontroller uses a unique bitwise parallel communication protocol approach. Here, three-bits representation is used to represent eight types of lines, as depicted in Table 1 below. In the Table 1 below, each row of a first column represents a line type of each line. Each row of a second column represents a line code associated with each of the type of line. For example, the line code for a straight line may be 0, the line code for a dotted line may be 1, and the like. Further, the GP 26 pin, the GP 21 pin, and the GP 18 pin may be associated with the Raspberry Pi Pico microcontroller (represented as RP2040). Each of the GP 26 pin, the GP 21 pin, and the GP 18 pin is a GPIO pin of the Raspberry Pi Pico microcontroller which are connected directly with a corresponding digital pin, i.e., the D 9 pin, the D 15 pin, and the D 25 pin of the Arduino mega mini microcontroller. Each GPIO pin of the Raspberry Pi Pico microcontroller is used as an output pin to transfer the bitwise representation of the line type. Further, each digital pin of the Arduino mega mini microcontroller is used as an input pin to receive the bitwise representation of the line type. Further, according to the line type prediction, each GPIO pin of the Raspberry Pi Pico microcontroller is set to a high state (represented as 1) or a low state (represented as 0), which is received by the corresponding digital pin of the Arduino mega mini microcontroller to set a maximum base speed for the line-following robot accordingly. In other words, when the GPIO pin is set to 1, the GPIO pin represents the high state (also referred to as "an on state"). In the high state, the GPIO pin provides a voltage, which is interpreted as "true" by the corresponding digital pin. Further, when the GPIO pin is set to 0, the GPIO pin represents the low state (also referred to as "an off state"). In the low state, the GPIO pin does not provide any voltage, which is interpreted as "false" by the corresponding digital pin.

TABLE 1

| Line Type | Line Code | RP2040 GP 26 | RP2040 GP 21 | RP2040 GP 18 | Curvature, R (in cm) |
|---|---|---|---|---|---|
| Straight | 0 | 0 | 0 | 0 | infinite |
| Dotted | 1 | 0 | 0 | 1 | infinite |
| Intersection | 2 | 0 | 1 | 0 | infinite |
| Branch | 3 | 0 | 1 | 1 | infinite |
| Sharp Turn | 4 | 1 | 0 | 0 | 5 |
| Acute Turn | 5 | 1 | 0 | 1 | 1 |
| Mild Curve | 6 | 1 | 1 | 0 | 60 |
| Tight Curve | 7 | 1 | 1 | 1 | 30 |

To ensure the line-following robot maintains a trajectory while turning, knowing the maximum base speed that the line-following robot can handle is crucial. To determine the maximum base speed the line-following robot can handle to stay on a track, a coefficient of static friction is required to calculate the speed for the line-following robot. In an embodiment, the coefficient of static friction can be determined using an inclined plane method. In the inclined plane method, the line-following robot is placed on a surface similar to the one on which the line-following robot will operate on during its tasks. Then, the surface is gradually tilted parallel until each wheel (i.e., each wheel of the first wheel set and the second wheel set) of the line-following robot begin to slide. An angle at which each wheel begins to slide is known as an inclined angle (θ). Further, the inclined angle (θ) is then recorded, to calculate the coefficient of static friction ($\mu_s$) using an equation 1 given below:

$$\mu_s = \tan\theta \tag{1}$$

In an embodiment, to enable the line-following robot to stay on the track (i.e., the assembly line), a centripetal force ($F_c$) must be less than or equal to a static friction force ($F_s$), i.e., $F_c < F_s$. The maximum base speed for the line-following robot, i.e., a maximum speed that the line-following robot can handle without slipping is when $F_c$ is equal to $F_s$, and is calculated using an equation 2 and an equation 3 below:

$$\frac{mv_{max}^2}{R} = \mu_s m g \tag{2}$$

$$v_{max} = \sqrt{\mu_s R g} \tag{3}$$

In the equation 2 and equation 3 above 'm' represents the mass of the line-following robot, '$v_{max}$' is the maximum speed of the line-following robot, 'g' is an acceleration due to gravity, '$\mu_s$' coefficient of static friction, 'R' is a radius of curvature of the type of the line to be followed by the line-following robot. The radius of curvature, i.e., 'R' is depicted via each row of a last column in the Table 1. A value 'infinity' of 'R' indicates that there is no curvature is present in a line, meaning a path associated with the line is a straight path. A numeric value, e.g., 5, 1, 60, 30 of 'R' indicates the radius of curvature on the line. For example, a curvature of 5 centimeters (cm) indicates that the line-following robot needs to navigate a relatively sharp turn, while a curvature of 60 cm indicates a gentler curve.

Figure 4:
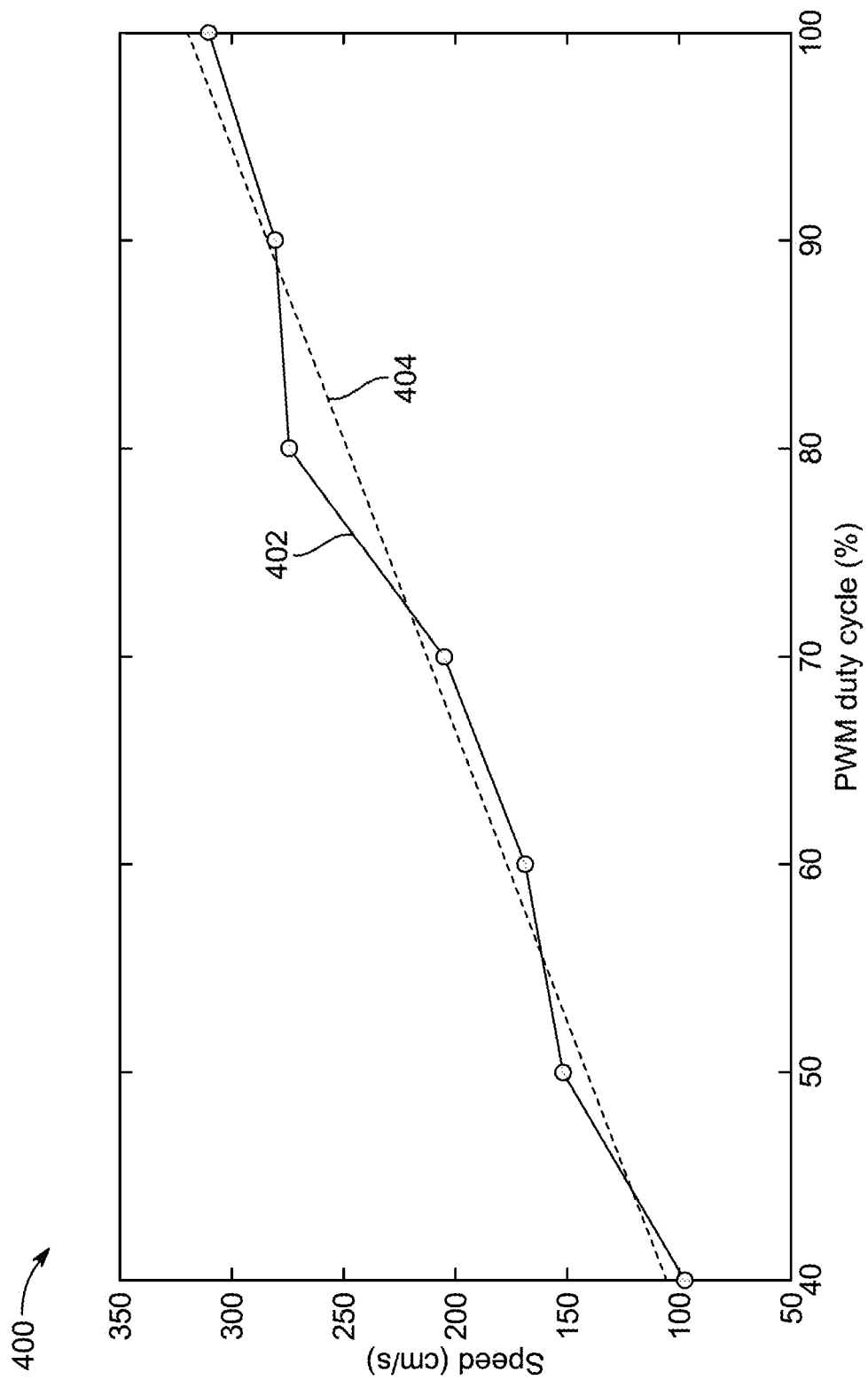
FIG. 4 is an exemplary graph illustrating a speed and a Pulse Width Modulation (PWM) cycle of the line-following robot, according to certain embodiments.

Referring to FIG. 4, the present disclosure further provides an exemplary graph 400 illustrating a speed and a PWM signal cycle of a line-following robot, according to certain embodiments. An 'X-axis' of the graph 400 represents a speed of the line-following robot for the track. The speed is calculated in centimeters per second (cm/s). A 'Y-axis' of the graph 400 represents a PWM signal cycle (also referred to as a PWM duty cycle) of the line-following robot for the track. The PWM is calculated in percentage (%). The graph 400 illustrating a relationship between the speed and the PWM signal cycle is obtained by collecting data from running the line-following robot on a previously measured track. A Table 2 below shows collected data 402 of the line-following robot on the previously measured track. FIG. 4 illustrates, the collected data 402 and linear data 404.

| PWM, ($S_b$) | Speed (cm/s) |
|---|---|
| 100 | 98 |
| 125 | 152 |
| 150 | 169 |
| 175 | 205 |
| 200 | 274 |
| 225 | 281 |
| 250 | 310 |

The relationship between the speed and the PWM signal cycle is an important factor to control the speed of each motor of the line-following robot. This collected data 402 of the line-following robot for the previously measured track is used for linear regression approximation, and below equation 4 is obtained:

$$v_{lin} = 1.4 S_b - 37 \tag{4}$$

The '$v_{lin}$' represents a linear speed of the line-following robot, and '$S_b$' represents a PWM signal value corresponding to the linear speed. To determine a relation between the radius of curvature, i.e., 'R' and a PWM signal, the maximum speed of the line-following robot is set equal to the linear speed derived from the PWM signal as represented via an equation 5 below:

$$v_{max} = v_{lin} \tag{5}$$

Further, based on the above equation 5, the PWM signal value is obtained in terms of the radius of curvature 'R' and the coefficient of static friction '$\mu_s$', as represented via an equation 6 below:

$$S_b = \frac{\sqrt{\mu_s R g} + 37}{1.4} \tag{6}$$

Figure 5:
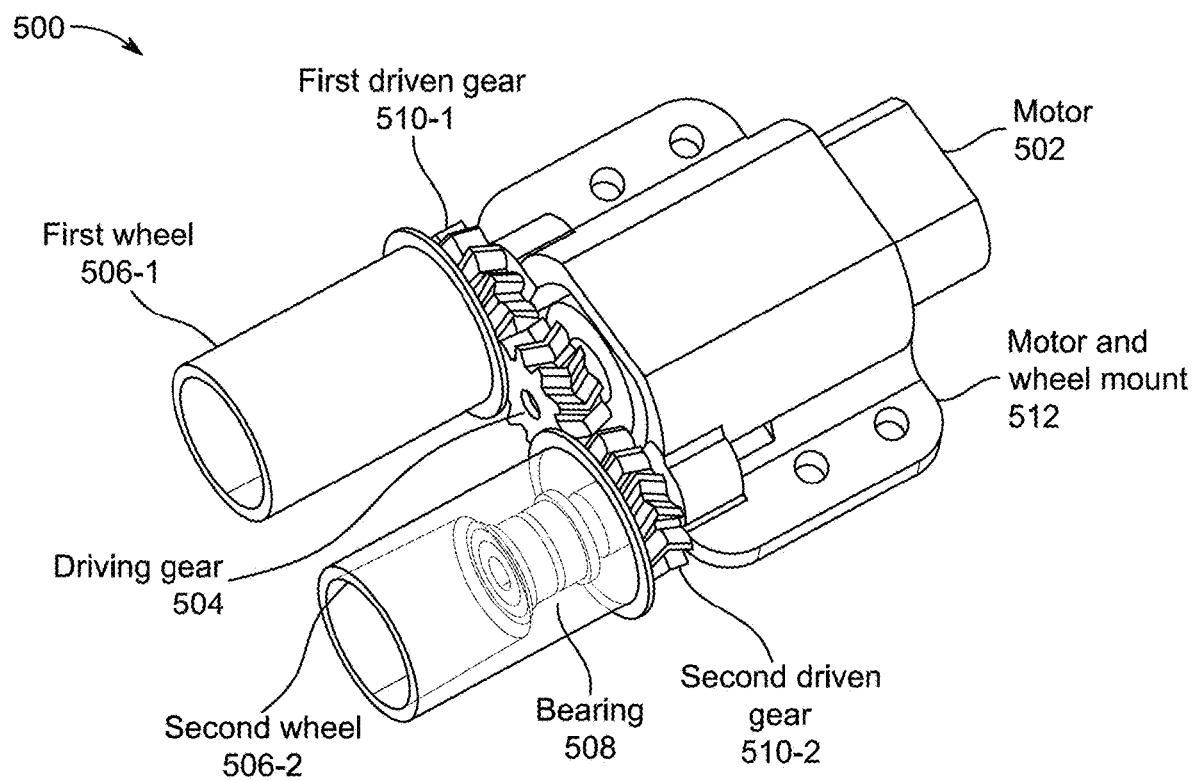
FIG. 5 is an exemplary diagram of a wheel assembly associated with the line-following robot, according to certain embodiments.

Referring to FIG. 5, the present disclosure further provides an exemplary diagram of a wheel assembly 500 associated with a line-following robot, according to certain embodiments. The wheel assembly 500 may be one of the first wheel set or the second wheel set of the line-following robot. The first wheel set and the second wheel set are disposed opposite one another on opposing sides of the bottom of the line-following robot. The wheel assembly 500, i.e., each of the first wheel set and the second wheel set includes two wheels. The two wheels are used to enhances an overall surface traction. Further, each of the two wheels may be made of silicone to further adjust the surface traction. These two wheels provide improved grip and stability, contributing to the line-following robot's performance.

The wheel assembly 500 includes a motor 502 having a driving gear 504. The motor 502 may be, for example, a 180 planetary gear motor (also referred to as a Direct Current (DC) gear motor). The motor 502 may be mechanically connected to the two wheels, depicted as a first wheel 506-1 and a second wheel 506-2. Each of the two wheels includes a bearing 508. The bearing 508 is configured to provide support and stability to each wheel, reduce friction between moving parts, and help distribute loads evenly across the wheel assembly 500 and the like. The first wheel 506-1 has a first driven gear 510-1 and the second wheel 506-2 has a second driven gear 510-2 as depicted via the wheel assembly 500. As depicted via FIG. 5, the first driven gear 510-1 and the second driven gear 510-2 have a first radius larger than a second radius of the driving gear 504. Moreover, the driving gear 504, the first driven gear 510-1, and the second driven gear 510-2 have a co-planar rotation and are in contact through a herringbone pattern.

The herringbone pattern includes a V-shaped teeth for the driving gear 504, the first driven gear 510-1, and the second driven gear 510-2 facilitate smoother power transmission and minimize vibrations, resulting in quieter operation. This unique design of the driving gear 504, the first driven gear 510-1, and the second driven gear 510-2 effectively cancels axial thrust forces that act along a shaft, thereby eliminating a need for thrust bearings. The wheel assembly 500 further depicts a motor and wheel mount 512. The motor and wheel mount 512 serve to securely position the motor 502, which drives the two wheels, ensuring efficient power transmission and stability during movement. Additionally, the motor and wheel mount 512 align each of the two wheels for enhanced traction and maneuverability, enabling the line-following robot to navigate accurately along the predicted line-type.

Figure 6:
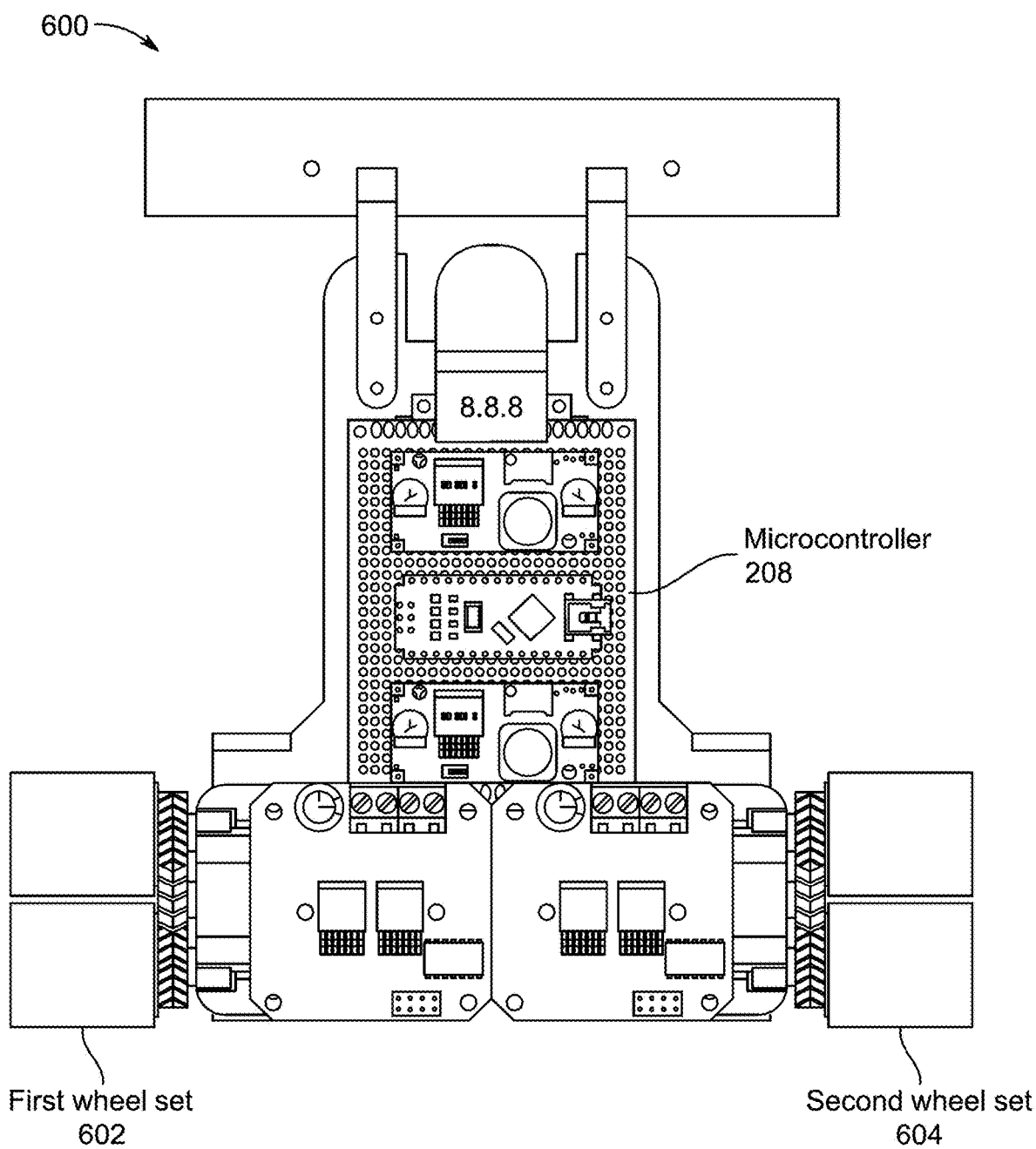
FIG. 6 is an exemplary diagram depicting a cross-sectional top view of the line-following robot including various components, according to certain embodiments.

Referring to FIG. 6, the present disclosure further provides an exemplary diagram 600 depicting a cross-sectional top view of the line-following robot including various components, according to certain embodiments. As depicted in FIG. 6, the line-following robot includes a first wheel set 602 and a second wheel set 604. Each of the first wheel set 602 and the second wheel set 604 may correspond to the wheel assembly 500. The line-following robot further includes the microcontroller 208. The microcontroller 208 corresponds to the Arduino mega mini microcontroller. The microcontroller 208 serves as the primary control unit to facilitate the movement of the line-following robot.

As depicted in FIG. 6, the line following robot is designed to fit in a pre-defined size, for example, 20 cm×20 cm×20 cm cube size. A critical aspect of this design of the line-following robot is weight distribution, such that a structural framework of the line-following robot is engineered to concentrate a large amount (e.g., approximately 70%) of a total weight in a rear section where the first wheel set 602 and the second wheel set 604 are located. This configuration enhances traction at each wheel, improving overall stability and control. Further, the remaining weight (e.g., approximately 30%) of the total weight is distributed towards a front section, allowing for quick and effortless turning maneuvers.

Figure 7:
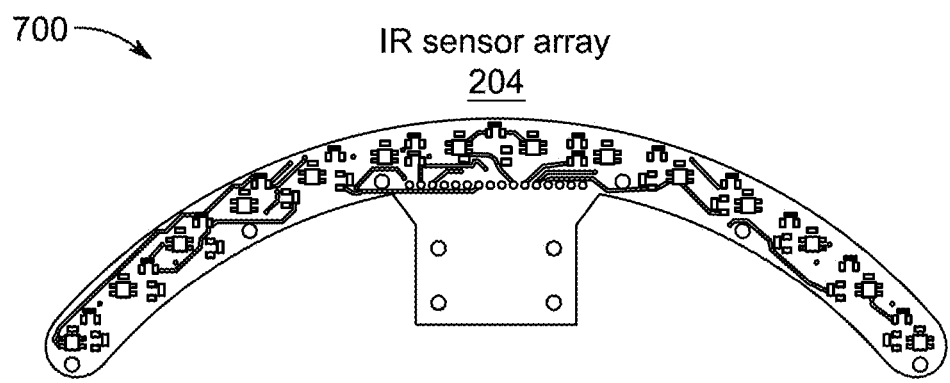
FIG. 7 is an exemplary diagram depicting a Printed Circuit Board (PCB) design of an IR sensor array, according to certain embodiments.

Referring to FIG. 7, the present disclosure further illustrates an exemplary diagram 700 depicting a Printed Circuit Board (PCB) design of the IR sensor array, according to certain embodiments. The IR sensor array may correspond to the IR sensor array 204. The IR sensor array 204 is connected to the microcontroller 208. Further, the IR sensor array 204 is disposed on the line-following robot, and oriented in the direction of the travel of the line-following robot. As depicted in FIG. 7, the IR sensor array 204 includes the plurality of sensors facing towards the surface of the assembly line. Each of the plurality of sensors may correspond to an IR light reflection switch of the plurality of IR light reflection switches. For example, the plurality of sensors included in the IR sensor array 204 may be fourteen sensors. Each of the fourteen sensors are systematically placed on the IR sensor array 204. In other word, each of the plurality of infrared light reflection switches of the IR sensor array 204 is evenly spaced on the arc-shaped PCB as depicted in FIG. 7. The arc-shaped PCB have a diameter of curvature substantially same with a length of the line-following robot. For example, an IR light reflection switch may correspond to a Surface Mount Device (SMD) IR sensor (e.g., ITR8307). The IR light reflection switch operates within a light reflection range and features a gallium arsenide (GaAs) IR light-emitting diode (LED) transmitter paired with a Negative-Positive-Negative (NPN) phototransistor that provides high sensitivity for short-distance detection.

Figure 8:
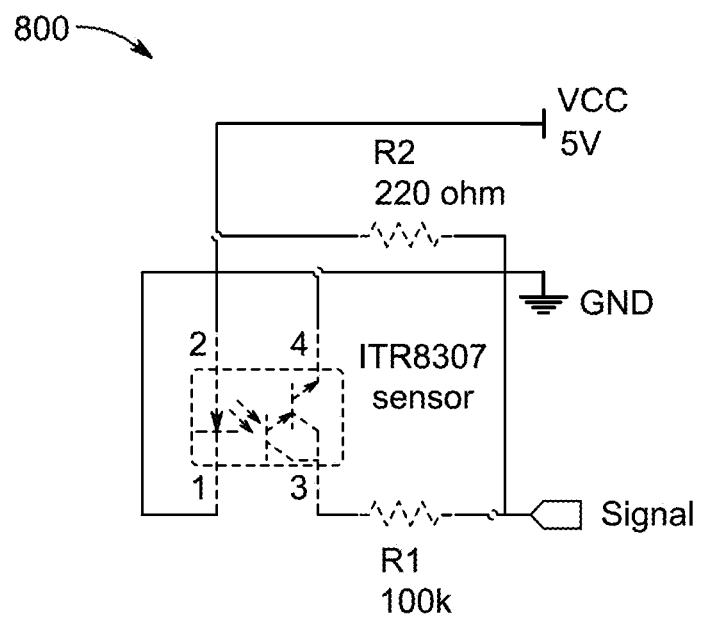
FIG. 8 is an exemplary circuit diagram of an IR sensor array, according to certain embodiments.

Referring to FIG. 8, the present disclosure further illustrates an exemplary circuit diagram 800 of the IR sensor array, according to certain embodiments. The IR sensor array may correspond to the IR sensor array 204. As depicted via the circuit diagram 800, a 220-ohm current limiting resistor (depicted as R2) is included in series with the GaAs IR LED transmitter to control a current flow, while a 100 k-ohm current limiting resistor (depicted as R1) is utilized on a reception side of the NPN phototransistor. The arc shaped PCB design of the IR sensor array 204 enhances the line-following robot's ability to detect and control objects in the path more effectively compared to a traditional straight sensor array.

Figure 9:
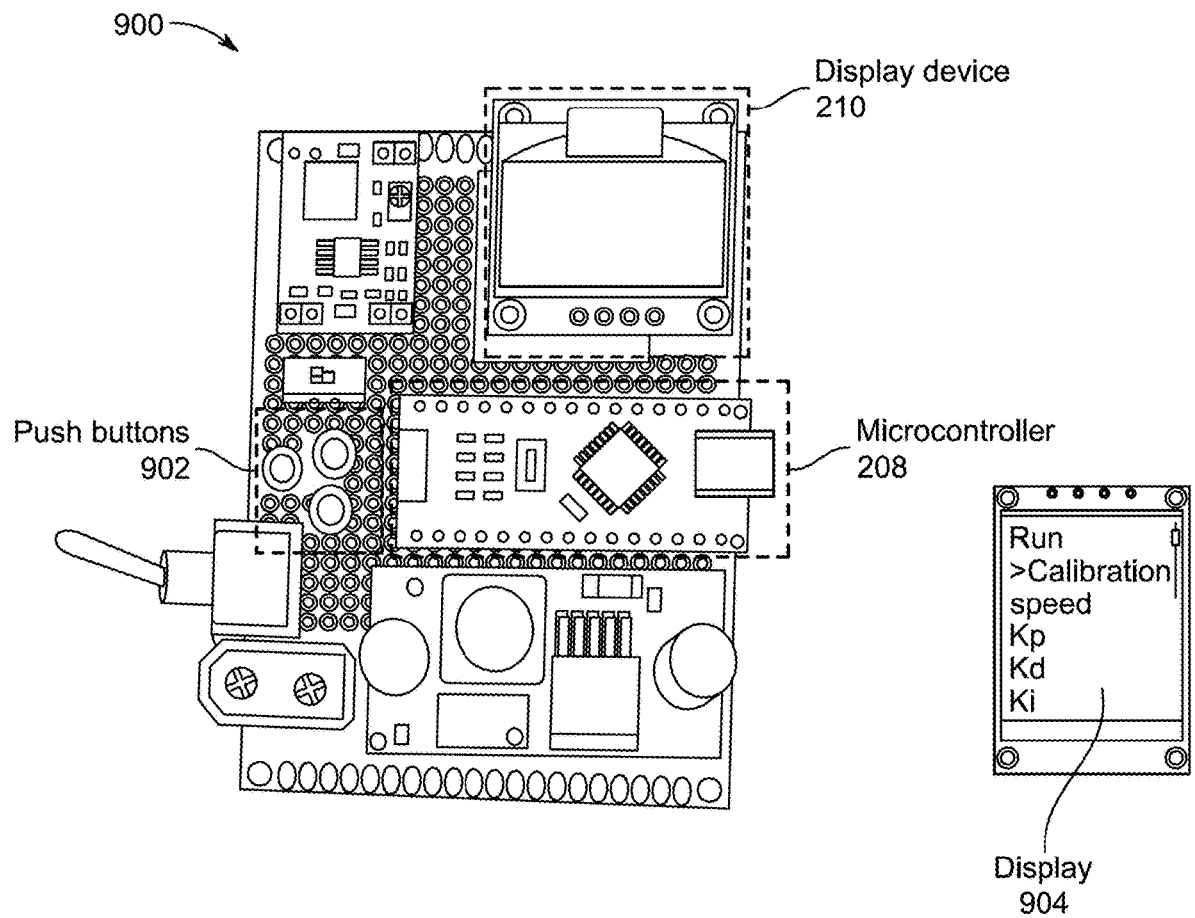
FIG. 9 is an exemplary diagram depicting various components of a Human-Machine Interface (HMI) module, according to certain embodiments.

Referring to FIG. 9, the present disclosure further illustrates an exemplary diagram 900 depicting various components of a HMI module, according to certain embodiments. The HMI module may correspond to the HMI module 106. As depicted in FIG. 9, the HMI module includes the display device 210 and push buttons 902 (i.e., the input device). The display device 210 and the push buttons 902 are connected to the microcontroller 208. The microcontroller 208 may correspond to the Arduino mega mini microcontroller. The display device 210, for example, is the OLED display device that facilitates the user interaction with the line-following robot. The user may be an operator of the line-following robot. The OLED display device displays important information, such as the plurality of sensor data, the predicted line-type, the speed of motor, and the like to allow the user to monitor and adjust the performance of the line-following robot as per requirement. The information is displayed to the operator as depicted via a display 904 of the OLED display device. Further, the push buttons 902 may correspond to the input device configured to receive the input parameter from the operator. The push buttons 902 are connected to digital pins of the Arduino mega mini microcontroller, utilizing internal pull-up resistors. The Arduino mega mini microcontroller monitors the push buttons 902 for a user press (i.e., the input parameters), enabling itself to execute different tasks based on the input parameter. The monitoring of the user press facilitates the creation of a menu system that utilizes the OLED display device and operates over an Inter-Integrated Circuit (I2C) communication protocol. The HMI module 106 provides the flexibility to the operator to perform various operations, such as calibrating the plurality of sensors, initiating a run, terminating a run, and adjusting parameters of the line-following robot. The parameters, for example, may include the motor speed, proportional gain, derivative gain, a sensitivity of each of the plurality of sensors, and the like.

Figure 10:
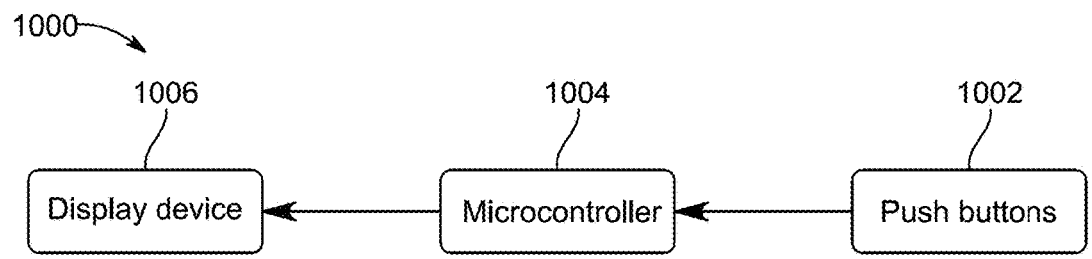
FIG. 10 is an exemplary diagram of a method for processing a user input by the HMI module, according to certain embodiments.

Referring to FIG. 10, the present disclosure further provides an exemplary diagram of a method 1000 for processing a user input by an HMI module, according to certain embodiments. The HMI module may correspond to the HMI module 106. Initially, at step 1002, the operator provides the user input (i.e., the input parameter) by pressing one or more push buttons 902. The input parameter may be, for example, a user press on a push button of the push buttons 902 to activate a calibration mode of the line-following robot. Once the operator provides the input parameter by pressing the push button, at step 1004, the microcontroller 208 encounters the user press of the push button based on monitoring of the push buttons 904. Further, based on the input parameter received from the operator, the microcontroller 208 activates the calibration mode of the line-following robot. Once the calibration mode is activated, at step 1006, a result, e.g., a message of activating the calibration mode, is displayed to the operator via the display device 210.

Figure 11:
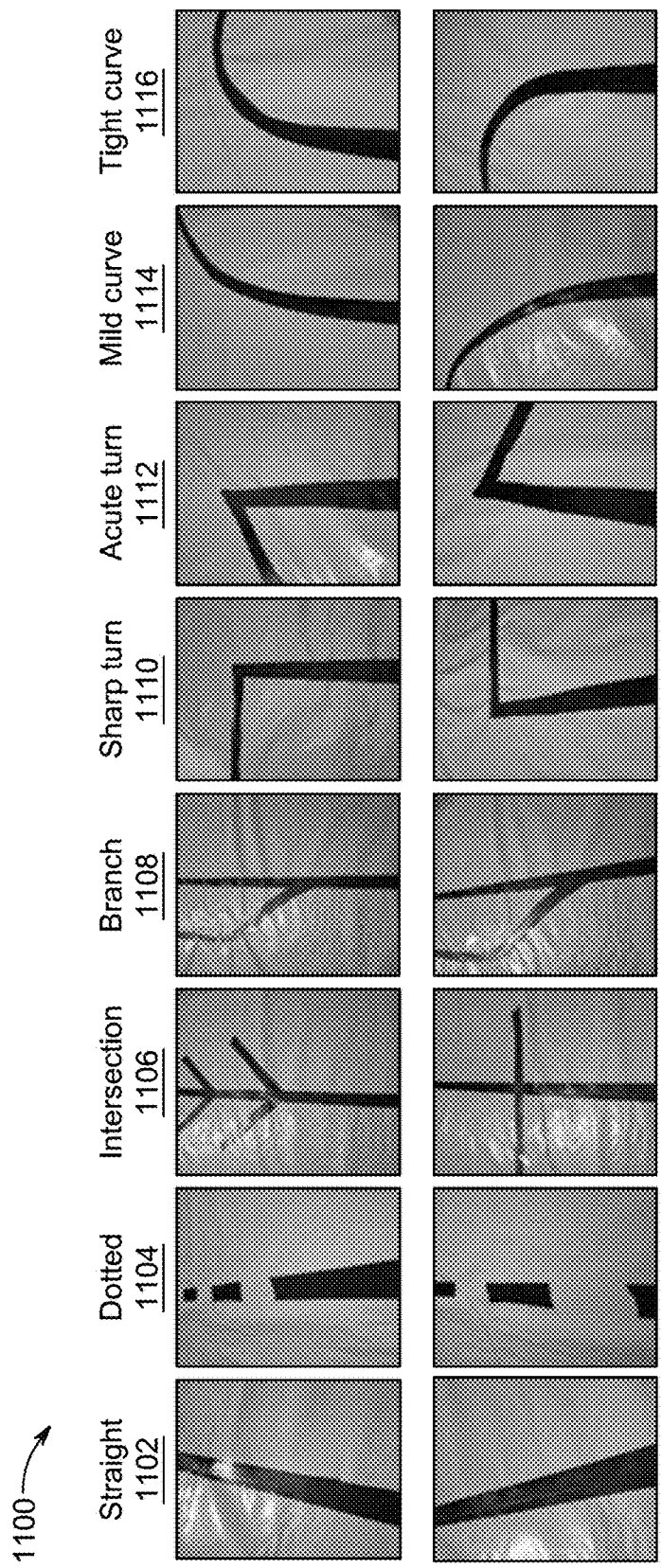
FIG. 11 is an exemplary diagram depicting a plurality of line images, according to certain embodiments.

Referring to FIG. 11, the present disclosure further illustrates an exemplary diagram 1100 depicting a plurality of line images, according to certain embodiments. The plurality of line images may be captured by the camera (same as the camera 202). The camera may be connected to the microcontroller 206. The microcontroller 206 may be the Raspberry Pi Pico microcontroller. The camera may be disposed on the front of the line following robot for collecting the plurality of images. As depicted in FIG. 11, the plurality of line images may include images of various types of lines, e.g., images of straight lines 1102, images of dotted lines 1104, images of intersecting lines 1106, images of branch lines 1108, images of lines with sharp turn 1110, images of lines with acute turn 1112, images of lines with mild curve 1114, images of lines with tight curve 1116. It should be noted that, for ease of explanation two images of each of the type of line is depicted. However, there will be multiple line images of each type based on the track (i.e., the assembly line) followed by the line-following robot. Further, each of the plurality of line images may be pre-processed to generate the training image data set from the plurality of line images.

The pre-processing of each of the plurality of images may be done based on the adaptive image processing techniques. Examples of the adaptive image processing techniques may include, but are not limited to, the AHE image processing technique, the Otsu's thresholding technique, the adaptive denoising image processing technique, the adaptive bilateral filtering image processing technique, the region-based segmentation image processing technique, the adaptive edge detection image processing technique, and the adaptive color correction image processing technique. The pre-processing of the plurality of line images is done by the microcontroller 206. Once the training image dataset is generated, the training image data set is used to train the neural network model to predict the line-type in each image of the training image data set. Examples of the neural network model may include, but are not limited to, the SVC model, the CNN model, the RNN model, the feed-forward neural network model, the deep reinforcement learning model, the GAN model, and the SOM. The camera (e.g., OV7670) may capture the plurality of line images in Red-Green-Blue (RGB) format at a pre-defined resolution, e.g., 48×48 pixels resolution for each line image. Once the plurality of line images is pre-processed to generate the training image data set, the training image dataset is stored on a Secure Digital (SD) card and later transferred to a system (e.g., a computer system) to train the neural network model for classification of the line-type in each line image. Once the neural network is trained, the trained neural network is deployed on the Raspberry Pi Pico microcontroller for predicting the line-type based on real-time line images.

Figure 12:
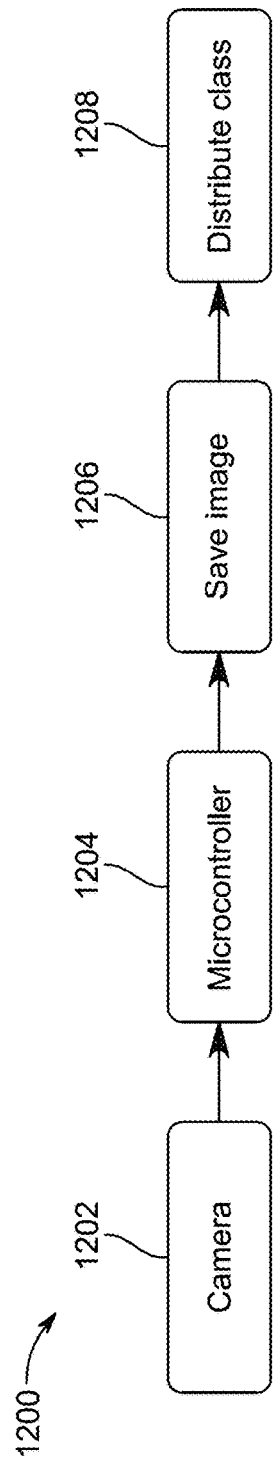
FIG. 12 is an exemplary diagram depicting a method for training a neural network model, according to certain embodiments.

Referring to FIG. 12, the present disclosure further illustrates an exemplary diagram depicting a method 1200 for training a neural network model, according to certain embodiments. Examples of the neural network model may include, but are not limited to, the SVC model, the CNN model, the RNN model, the feed-forward neural network model, the deep reinforcement learning model, the GAN model, and the SOM. Initially, at step 1202, the plurality of line images may be captured by the camera (e.g., the OV7670 camera). Once the plurality of line images is captured, at step 1204, each of the plurality of line images is pre-processed by the microcontroller 206, i.e., the Raspberry Pi Pico microcontroller, to generate the training image dataset for the neural network model. Once the training image dataset is generated, at step 1206, the training image dataset is saved on the SD card. Further, at step 1208, the training image data set is transferred from the SD to the neural network model to train the neural network model to predict the line-type in each line image of the training dataset. A technique for training the neural network model is further explained in detail in conjunction with FIG. 13.

Figure 13:
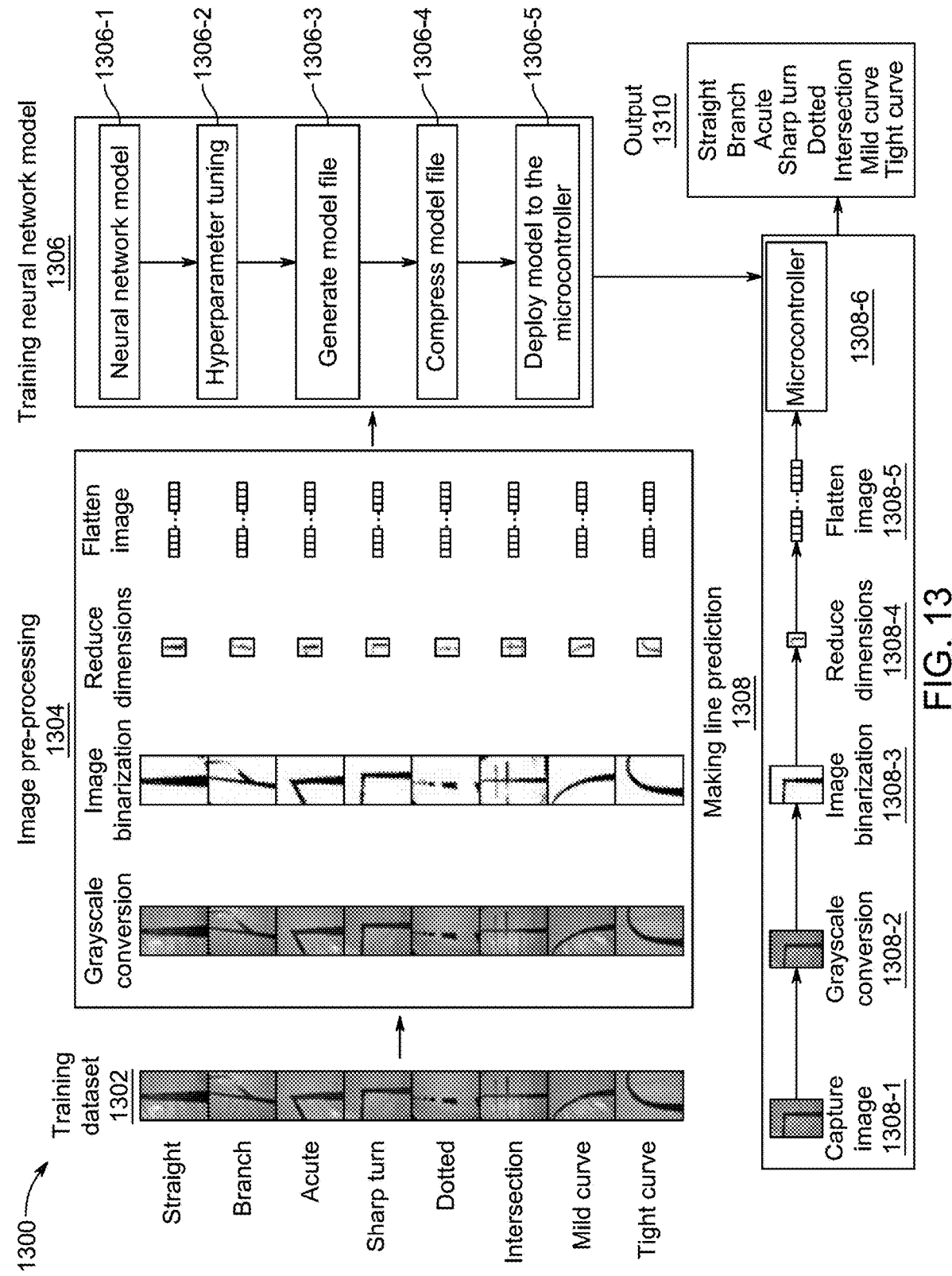
FIG. 13 is an exemplary diagram representing training of the neural network model for predicting a line-type, according to certain embodiments.

Referring now to FIG. 13, the present disclosure provides an exemplary diagram 1300 representing training of the neural network model for predicting the line-type, according to certain embodiments. Once the plurality of line images is captured and the training image dataset is generated, at step 1302, the training image dataset (represented as training dataset) is pre-processed. In an embodiment, each line image in the training image dataset may be of a pre-defined resolution, e.g., 3×48×48 pixels resolution. This reduced resolution allows the microcontroller 206, i.e., the Raspberry Pi Pico microcontroller, to maintain a shorter execution time, facilitating quicker predictions. In particular, at step 1304, an image pr-processing is performed for each line image in the training image dataset. As depicted in FIG. 13, the pre-processing of each line image includes various steps, such as, a grey scale conversion step, an image binarization step, a dimensionality reduction step (i.e., a step for generating each line image in a reduced dimension), a flatten image generation step, and the like.

Each line image that is generated after the greyscale conversion step, and the image binarization step may be of a pre-defined resolution, e.g., 48×48 pixels resolution. Further, each line image generated after the dimensionality reduction step may be of a pre-defined resolution, e.g., 12×12 pixels resolution. Furthermore, each line image generated after the flatten image generation step may be of a pre-defined resolution, e.g., 144 pixel resolution. In other words, the image pre-processing is applied to simplify classification and ensure accurate line type predictions under varying lighting conditions. The image pre-processing begins with converting each line image in the RGB format to a grayscale image. Subsequently, an Otsu's thresholding technique is utilized for image binarization to perform the image binarization step, which reduces the complexity of each line image. This resolution of each line image is then further decreased to 12×12 pixels, resulting in faster training and prediction times for the microcontroller 206 while achieving satisfactory outcomes. Further, each line image (in two-dimension) of 12×12 pixels is flattened into a one-dimension image of 144 pixels.

Once pre-processing of each line image is performed, each line image is provided as an input to the neural network model for training the neural network model depicted as step 1306. In particular, initially at step 1306, each flattened line image is provided as an input to the neural network model. Upon receiving each flattened line image, at step 1306-1, the neural network model is configured to perform hyperparameter tuning depicted as step 1306-2. The hyperparameter tuning sets appropriate operating conditions for the neural network model that processes line images. This hyperparameter tuning ensures that parameters such as a kernel type, a regularization strength, and a margin width in each line image are adjusted to improve the neural network model accuracy in classifying different line types (e.g., straight, curved, or dotted) under varying conditions. Upon performing the hyperparameter tuning, at step 1306-3, the model file (e.g., a compatible raw Python file) is generated. In an embodiment, the model file generated by the neural network model may include the architecture of the neural network model (e.g., the layer configurations and the activation functions), the learned weights and biases from training, and the hyperparameters (e.g., the learning rate, the batch size, the margin width, etc.) used during the training process of the neural network model. Once the neural network model is trained based on the training image dataset, at step 1306-5, the neural network model is deployed to the microcontroller 206 (i.e., the Raspberry Pi Pico microcontroller). Once the neural network model is deployed to the microcontroller 206, at step 1308, the neural network is configured to perform line prediction for the line-type in a real-time line image of the assembly line captured by the camera (same as the camera 202). For this, at step 1308-1, a real-time line image of a line ahead to be followed by the line following-robot is captured using the camera. Once the real-time line image is captured, at step 1308-2, the real-time line image is converted into a greyscale image, i.e., the greyscale conversion step is performed. Further, at step 1308-3, the image binarization step is performed on the converted greyscale image. After performing the image binarization, at step 1308-4, the dimension of the real-time line image is reduced, i.e., the dimensionality reduction step is performed. Further, the real-time image with reduced dimension is converted to a flattened image, i.e., the flatten image generation step is performed. Further, at step 1308-6, the flattened image is provided as an input to the microcontroller 206 that includes the trained neural network model. Further, at step 1310, the trained neural network model processes the flattened image to predict and generate an output, i.e., the line-type of the line ahead of the line-following robot. For example, the line-type may be a line with the sharp turn.

Figure 14:
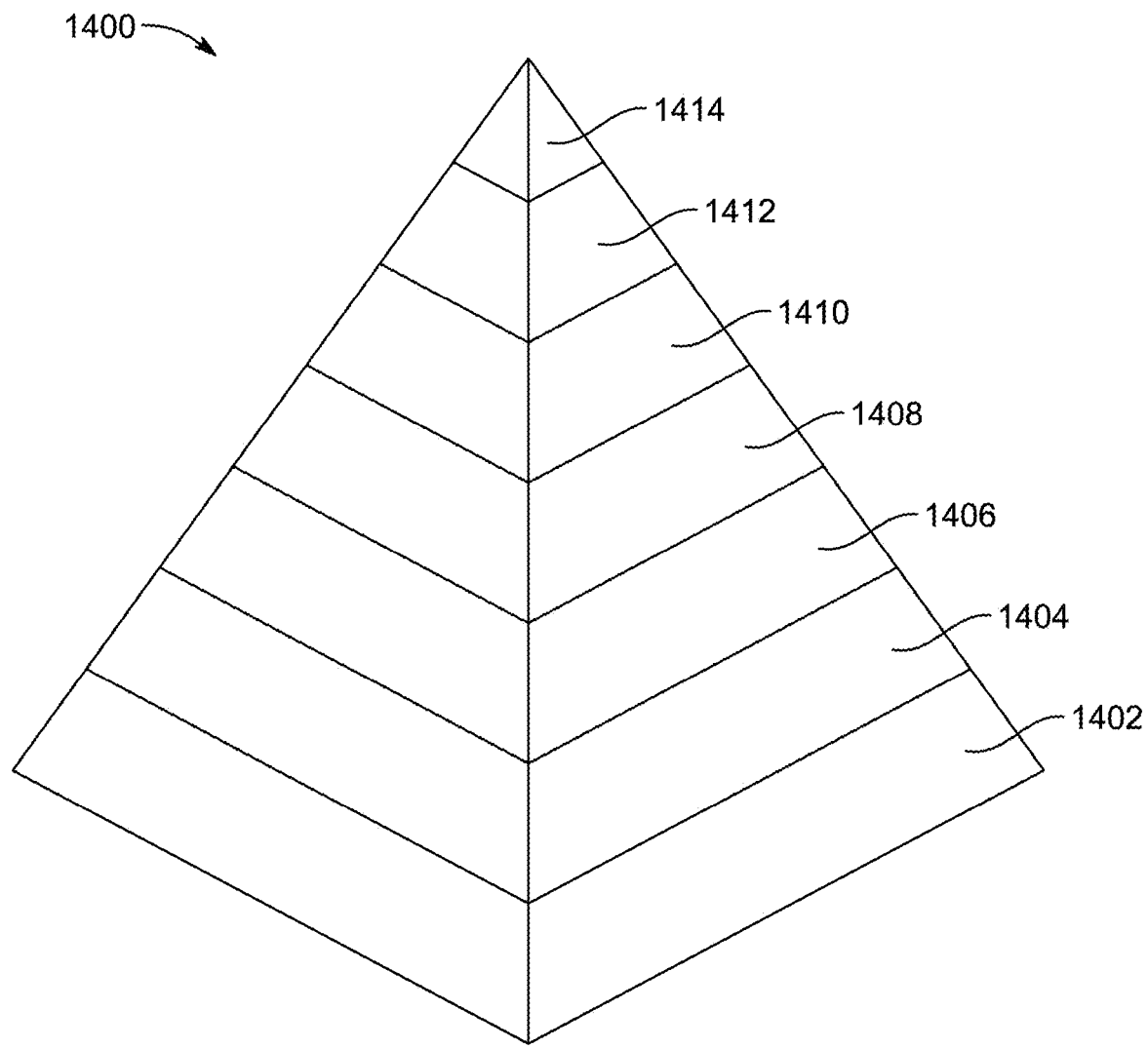
FIG. 14 is an exemplary diagram depicting a process flow of controlling the line-following robot in an assembly line, according to certain embodiments.

Referring to FIG. 14, the present disclosure provides an exemplary diagram depicting a process flow 1400 of controlling the line-following robot in the assembly line, according to certain embodiments. To control the line-following robot, initially at step 1402, a line image is captured in real-time using the camera. Further, at step 1404, the line image is pre-processed using the adaptive image processing technique (e.g., Otsu's thresholding technique). The pre-processing of the line image is already explained in detail in conjunction with FIG. 13. In other words, the line image is first resized and then the adaptive image processing technique is applied for pre-processing the line image. This ensures that the neural network model can operate effectively under varying lighting conditions. Once the captured line image is pre-processed, at step 1406, the line image is provided as the input to the trained neural network model. The neural network model is configured to predict the line type (e.g., a mild curve line) of the line in the line image. Once the line type of the line is predicted, at step 1408, the predicted line type is converted into the corresponding bitwise representation (e.g., three bits representation) for transmission from the Raspberry Pi Pico microcontroller (i.e., the microcontroller 206) to the Arduino mega mini microcontroller (i.e., the microcontroller 208). Further, the base speed for the line-following robot is calculated by the Arduino mega mini microcontroller based on the predicted line type. In other words, this prediction of the line-type is utilized by the Arduino mega mini microcontroller to adjust the line-following robot's base speed based on the line type. For instance, the line-following robot may operate at a higher speed when following a straight line and at a reduced speed while navigating through the mild curve line.

Further, at step 1410, the plurality of sensor data is collected from the IR sensor array 204. Based on the plurality of sensor data, the base position of the line-following robot on the line is calculated. Once the base position is calculated, at step 1412, the control signal is generated based on the base speed, the base position, and the line-type using the PID algorithm. The control signal includes the plurality of PWM signals. In other words, based on the base speed, the base position, and the line-type, the speed of each of the plurality of motors is calculated to adjust the speed of each motor. Further, based on the calculated speed, the plurality of PWM signals is generated. Further, at step 1414, the motor driver receives each of the plurality of PWM signals and regulates the rotational motion of each of the plurality of motors to adjust the speed of the line-following robot.

Figure 15:
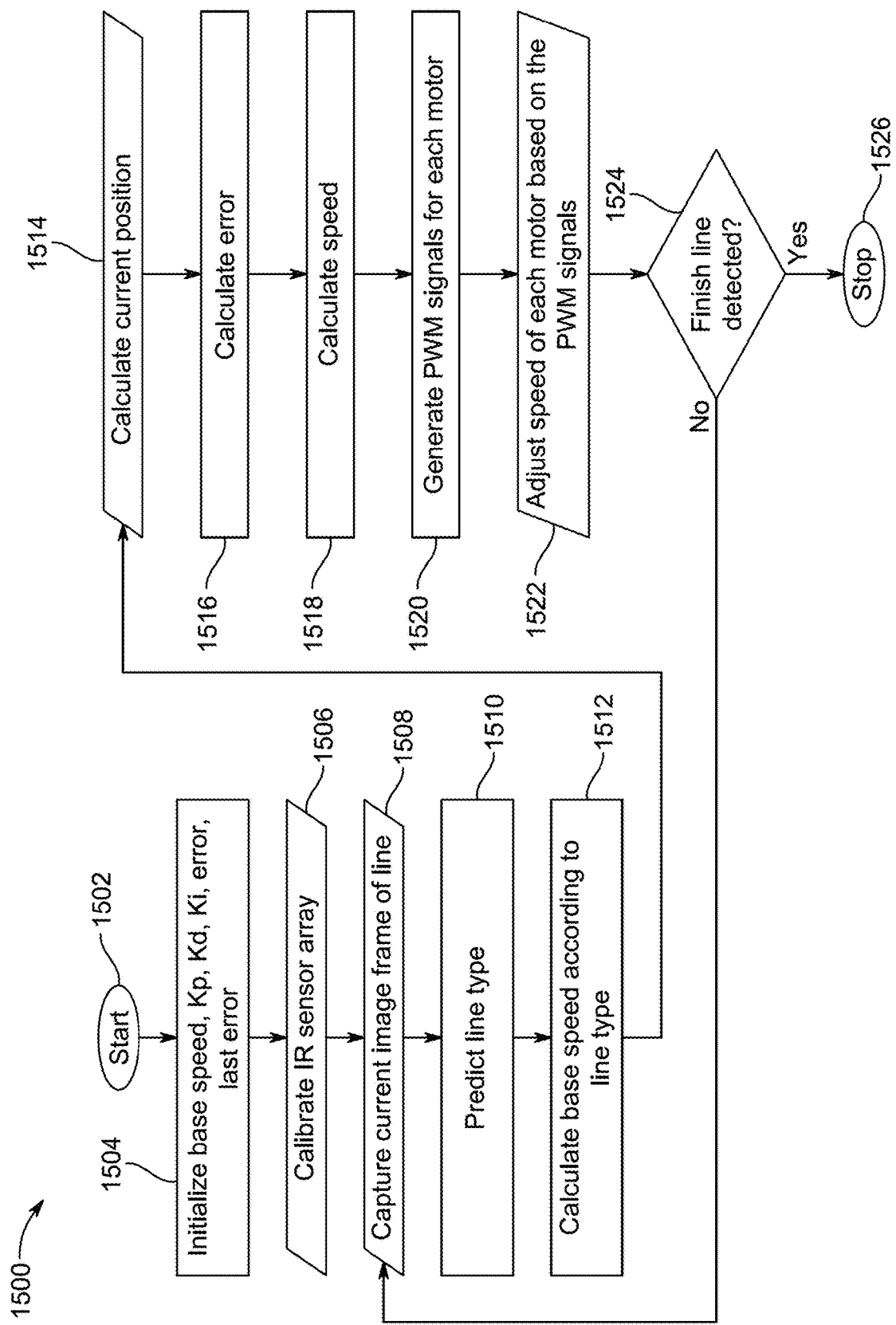
FIG. 15 is an exemplary flow diagram depicting a process of controlling the line-following robot on the assembly line, according to certain embodiments.

Referring to FIG. 15, the present disclosure further provides an exemplary flow diagram 1500 depicting a process of controlling the line-following robot on the assembly line, according to certain embodiments. The process to control the line-following robot on the assembly line starts at step 1502. Initially, at step 1504, each parameter used by the microcontroller 208 for calculating the speed of each of the plurality of motors is initialized using the PID algorithm. A Table 4 below represents a notation of each parameter used by the microcontroller 208 for calculating the speed calculation of each of the plurality of motors using the PID algorithm. Each row of a first column represents the notation of each parameter. Each row of a second column represents a description of each parameter. Further, each row of a third column represents an exemplary value range associated with each parameter.

TABLE 4

| Notations | Description | Value Range |
|---|---|---|
| $K_p$ | Proportional constant | 0-0.1 |
| $K_d$ | Derivative constant | 0-1 |
| $K_i$ | Integral constant | 0-2 |
| $S_C$ | Speed constant | 0-255 |
| $S_b$ | Base speed | 0-255 |
| $S_{adj}$ | Speed adjustment according to error | 0-255 |
| $S_L$ | Left motor speed | 0-255 |
| $S_R$ | Right motor speed | 0-255 |
| $G_b$ | Gain for base speed | 0-1 |
| ref | Reference point of the center of IR sensor | 6500 |
| e | Error | (−6500)-6500 |
| d | Position | 0-13000 |
| $F_c$ | Centripetal force | x |
| $F_s$ | Static frictional force towards curve center | x |
| $\mu_s$ | Coefficient of static friction | 0.4 |
| R | Radius of curvature | 0-inf |
| g | Gravitational acceleration | 980 cm/s$^2$ |
| $Ir_n$ | Analog value of IR sensor reading | 0-1023 |
| T | Execution time of a single iteration of code | 250-300 ms |

Further, at step 1506, the JR sensor array is calibrated. The calibration of the JR sensor array is performed based on the input parameter received from the operator. At step 1508, a current image (i.e., the real-time image) of the line ahead to be followed by the line-following robot is captured. Once the real-time image is captured at step 1510, the line-type of the line in the real-time image is predicted. The line-type of the line is predicted using the neural network model. Once the line-type of the line is predicted, at step 1512, the base speed is calculated for the line-following robot based on the line-type. Upon calculating the base speed, at step 1514, a current position (i.e., the base position) of the line-following robot is calculated. To calculate a value of the current position, initially, a reference position (e.g., a start position) of the line-following robot is established based on the center of the IR sensor array (same as the IR sensor array 204), which the PID algorithm uses to adjust the speed of each motor and maintain alignment of the line-following robot. In an embodiment, the current position represented as a position (p) of the IR sensor array is calculated using an equation 7 below:

$$p = \frac{\sum_{n=0}^{i-1} 1000 n Ir_n}{\sum_{n=0}^{i-1} Ir_n} \quad (7)$$

In the above equation 7, 'p' represents a calculated current position of the IR sensor array, which indicates a perceived location of the line relative to the center of the IR sensor array. Further, 'n' represents an index variable that represents an individual sensor in the IR sensor array, ranging from 0 to i–1. Further, 'i' represents a total number of sensors in the IR sensor array. Further, '$Ir_n$' represents a reading of an IR light signal intensity from the '$n_{th}$' IR sensor. This reading indicates an amount of IR light detected by that particular IR sensor, which varies based on the color and reflectivity of the surface beneath the IR sensor.

Once the current position (p) of the IR sensor array is calculated, at step 1516, an error 'e' (also referred to as the positional error) is calculated by subtracting the reference position from the current position of the IR sensor as depicted via an equation 8 below:

$$e = \text{reference position} - p \quad (8)$$

Further, at step 1518, the motor speed for the line-following robot is calculated. In other words, adjustments '$S_{adj}$' required to control the motor speed of each motor are calculated using the PID algorithm mentioned via an equation 9 below:

$$S_{adj} = K_p e + K_d \frac{(e - e_{last})}{T} + K_i eT \quad (9)$$

In this equation 9, '$k_p$' (proportional gain) adjusts the response speed, reducing rise time but may lead to increased overshoot, '$k_d$' (derivative gain) helps to dampen this overshoot by reacting to the rate of error change, and '$k_i$' (integral gain) corrects any steady-state error by accumulating past errors, ensuring the system eventually reaches a desired setpoint.

Once the speed for each motor is calculated, at step 1520, PWM signals (i.e., the control signal) are generated for each motor. In particular, a value for the PWM signals generated for each motor, i.e., the left motor '$S_L$' and the right motor '$S_R$' are calculated using the equation 10 and an equation 11 respectively:

$$S_L = S_b - S_{adj} \quad (10)$$

$$S_R = S_b + S_{adj} \quad (11)$$

In the above equation 10 and the equation 11, '$S_b$' represents the base speed of the line-following robot. Further, at step 1522, the generated PWM signals are sent from the microcontroller 208 (i.e., the Arduino mega mini microcontroller) to the corresponding motor driver, allowing each motor to adjust the speed appropriately and keep the line-following robot on the assembly line. Further, at step 1524, a check is performed to determine whether the line is the finish line of the assembly line. In one embodiment, based on the check performed, when the line is the finish line, the process of controlling the line-following robot stops, as mentioned via step 1526. In another embodiment, based on the check performed, when the line is not the finish line, steps 1508-1524 of the process of controlling the line-following robot are re-executed.

Figure 16:
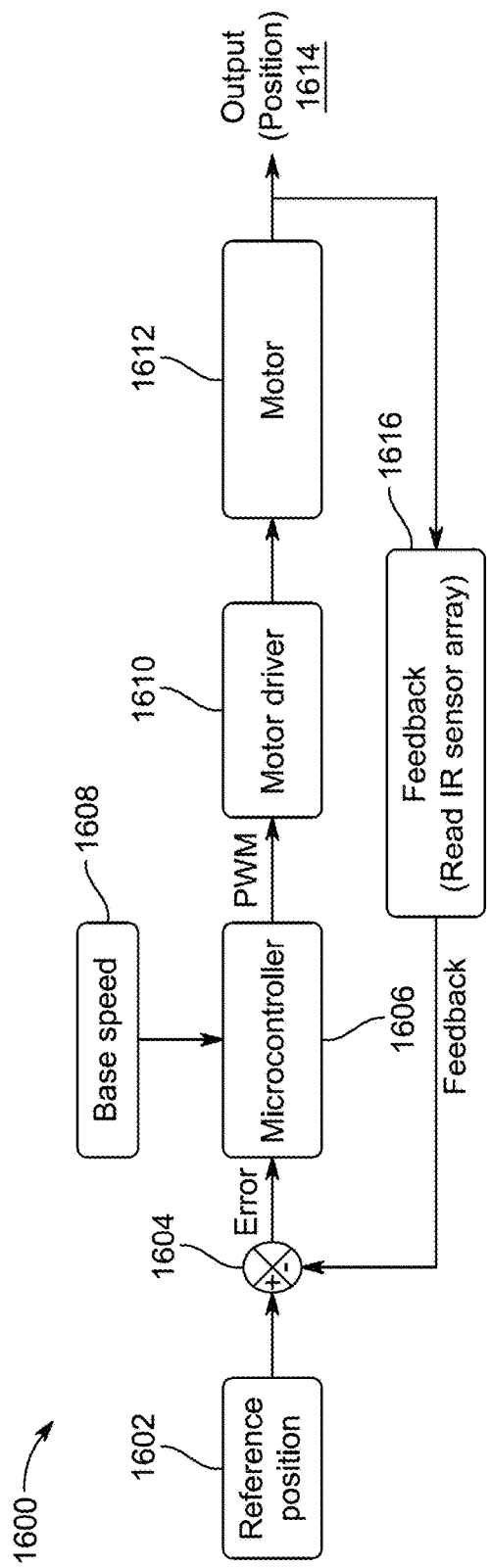
FIG. 16 is an exemplary flow diagram depicting a process of controlling a speed of motors of the line-following robot, according to certain embodiments.

Referring to FIG. 16, the present disclosure provides an exemplary flow diagram 1600 depicting a process of controlling the speed of motors of the line-following robot, according to certain embodiments. The motors may correspond to the plurality of motors, i.e., the left motor and the right motor. In order to calculate the speed of each motor, initially, at step 1602, the reference position (e.g., the start position) of the line-following robot is established. The reference point is established based on the center of the IR sensor array (same as the IR sensor array 204), which the PID algorithm uses to adjust the speed of each motor and maintain alignment of the line-following robot. Further, the current position (i.e., position (p)) is calculated using the equation 7 disclosed in the FIG. 15.

Once the reference position and the current position is known, at step 1604, the error 'e' (also referred to as the positional error) is calculated by subtracting the reference position from the current position of the IR sensor of the IR sensor array. The error 'e' is calculated based on the equation 8 disclosed in the FIG. 15. Further, at step 1606, the speed for each motor of the line following robot is calculated. In particular, the error 'e' is provided as an input to the microcontroller 208 to calculate the speed for each motor. Additionally, at step 1606, the microcontroller 208 is configured to receive the base speed calculated for the line-following robot depicted via step 1608. The microcontroller 208 is configured to calculate the adjustments '$S_{adj}$' required to the speed of each motor using the PID algorithm using the equation 9 disclosed in the FIG. 15.

Once the adjustments '$S_{adj}$' required to the speed of each motor are calculated, the microcontroller 208 is configured to generate the PWM signals (i.e., the control signal) for the left motor '$S_L$' and the right motor '$S_R$' using the equation 10 and an equation 11 mentioned in FIG. 15. Further, at step 1610, the generated PWM signals are sent from the microcontroller 208 (i.e., the Arduino mega mini microcontroller) to the corresponding motor driver (e.g., BTS7960). Further, at step 1612, the motor driver is configured to adjust the speed of a corresponding motor appropriately. Once the speed of each motor is adjusted, at step 1614, an output representing the current position of the line-following robot is generated in real-time. Further, the output generated at step 1614 is provided as a feedback input to the microcontroller 208, as mentioned via step 1616.

Figure 17:
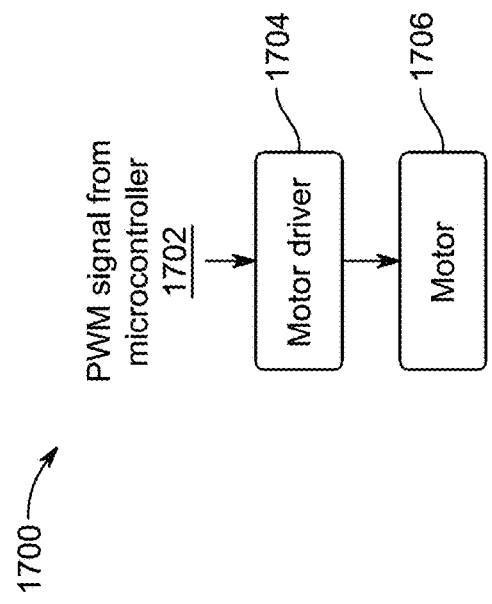
FIG. 17 is an exemplary diagram depicting a process flow for transmitting the PWM signals for adjusting the speed of the motors, according to certain embodiments.

Referring to FIG. 17, the present disclosure provides a process flow 1700 for transmitting the PWM signals for adjusting the speed of the motors, according to certain embodiments. To adjust the speed of each motor, i.e., the left motor and the right motor, at step 1702, the PWM signals (also referred to as the plurality of PWM signals) is received as the input from the microcontroller 208 (i.e., the Arduino mega mini microcontroller). In an embodiment, a PWM signal is generated with varying duty cycles based on the speed calculation performed by the microcontroller 208 using the PID algorithm.

Further, at step 1704, the received PWM signals are provided as the input to the motor driver associated with each of the left motor and the right motor. In particular, the PWM signals are used to control a gate of the corresponding motor driver associated with the left motor and the right motor. At step 1706, the corresponding motor driver is configured to adjust the speed of the left motor and the right motor appropriately. In an embodiment, as the duty cycle of the PWM signal changes, an output of the motor driver may also change proportionally, thus controlling the speed (also referred to as the rotational speed or the motor speed) of each motor. The duty cycle of PWM signal for the left motor and the right motor might change depending on a position of the IR sensor array.

Figure 18:
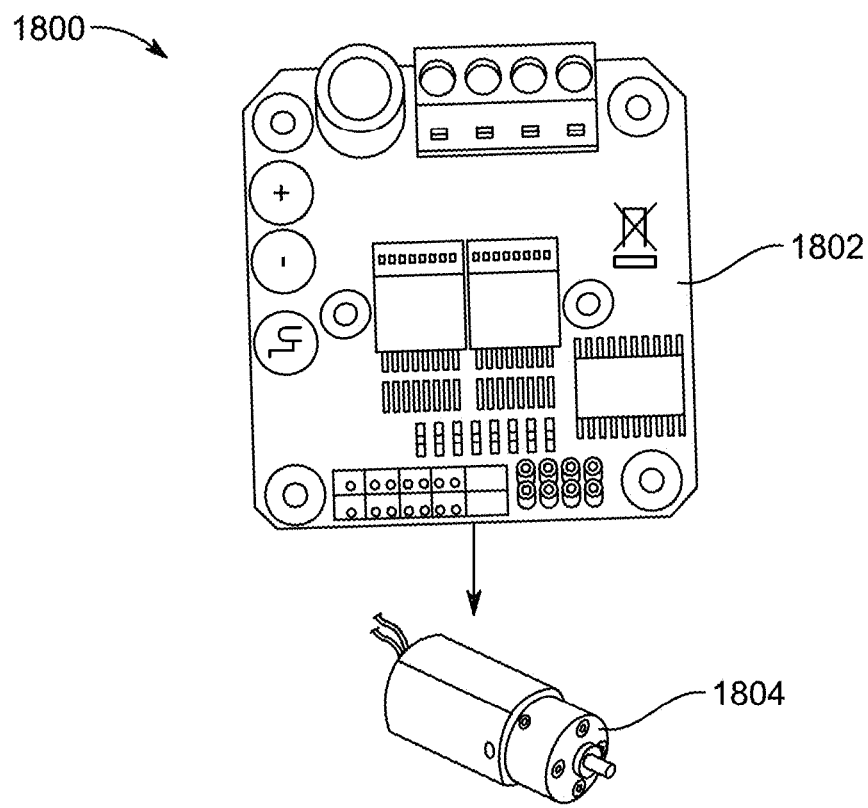
FIG. 18 is an exemplary diagram depicting components required to adjust the speed of the line-following robot, according to certain embodiments.

Referring to FIG. 18, the present disclosure illustrates an exemplary diagram 1800 depicting components required to adjust the speed of the line-following robot, according to certain embodiments. As depicted in FIG. 18, the components include a motor driver 1802 and a motor 1804. The motor driver 1802 (e.g., the BTS7960) may correspond to one of the motor driver 212-1 or the motor driver 212-2. As already explained, the motor driver 1802 may be configured to receive the PWM signal from the microcontroller 208. Further, the motor 1804 may correspond to one of the motor 214-1 (e.g., the left motor) or the motor 214-2 (e.g., the right motor). The motor is configured to enable the movement of the line-following robot.

Figure 19:
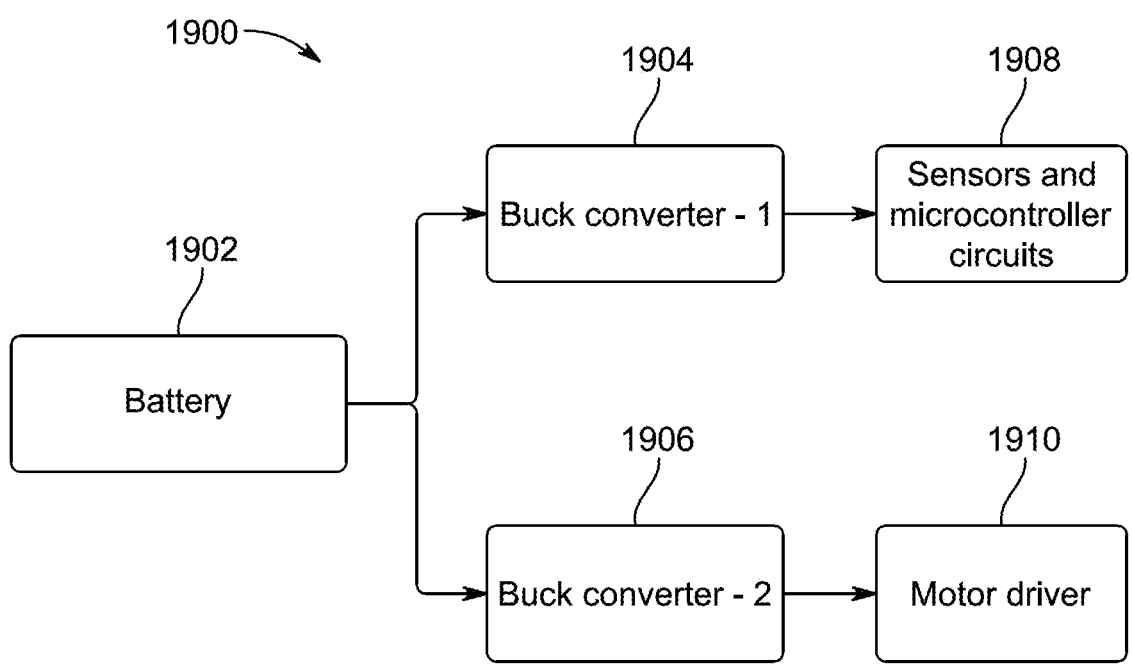
FIG. 19 is an exemplary diagram depicting various components of a power supply module of the line-following robot, according to certain embodiments.

Referring to FIG. 19, the present disclosure illustrates an exemplary diagram 1900 depicting various components of a power supply module of the line following robot, according to certain embodiments. The power supply module corresponds to the power supply module 110. The various components of the power supply module include a battery 1902, a buck-convertor-1 1904, a buck-convertor-2 1906, sensor and microcontrollers circuits 1908, and a motor driver 1910 (same as the motor driver 1802). The line-following robots generally work on the battery 1902. The battery 1902 may be a lithium polymer (Li—Po) battery as the Li—Po battery is light in weight and have small dimensions. For example, the battery 1902 used in the line-following robot may employ a 1000 milliampere-hour (mAh) 11.1 volt Li—Po battery.

Further, the buck convertor-1 1904 and the buck convertor-2 1906 are used to convert the voltage generated by the battery 1902 as per the sensor and microcontrollers circuits 1908, and the motor driver 1910 respectively. For example, microcontrollers (i.e., the microcontroller 206 and the microcontroller 208), sensors (i.e., the plurality of sensors of the IR sensor array), and motors (i.e., the left motor and the right motor) run on different voltage ratings. So, the 11.1 volts of the Li—Po battery 1902 is converted to the predefined voltage, e.g., 5 volts using the buck converter-1 1904 for the sensor and microcontrollers circuits 1908, which is used by the microcontrollers (e.g., the microcontroller 206 and the microcontroller 208) and the plurality of sensors. Further, the buck converter-2 1906 is used to convert 11.1 volts to 9 volts for the motor driver 1910 so that an associated motor (e.g., the left motor or the right motor) may be driven.

Figure 20:
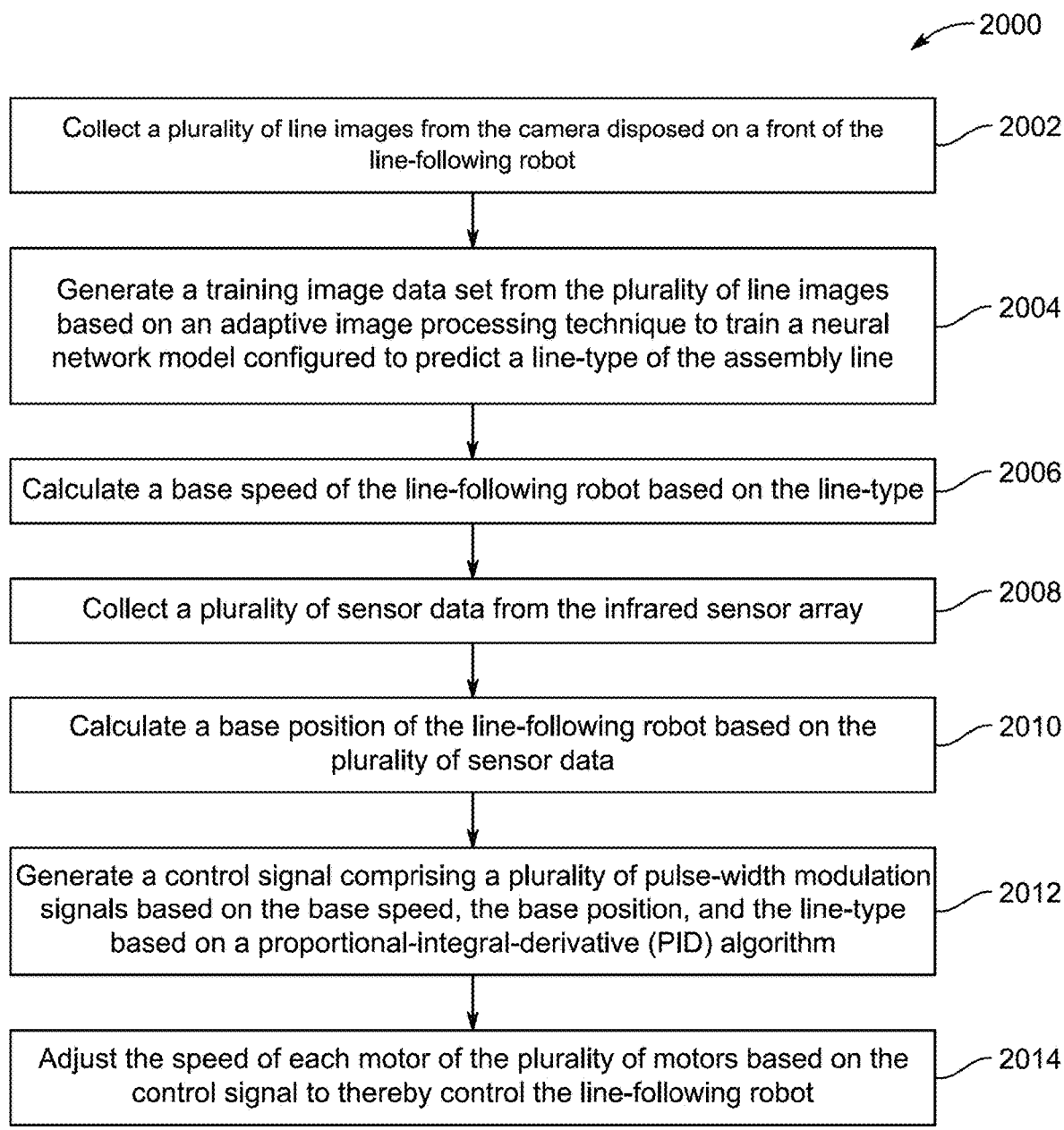
FIG. 20 is an exemplary diagram of a method for controlling the line-following robot on the assembly line, according to certain embodiments.

Referring to FIG. 20, the present disclosure provides an exemplary diagram of a method 2000 for controlling the line-following robot on the assembly line, according to certain embodiments. The line following robot includes the microcontroller (i.e., the microcontroller 206 and the microcontroller 208), the camera (e.g., the camera 202), the IR sensor array (e.g., the IR sensor array 204), the first wheel set (e.g., the first wheel set 602) and the second wheel set (e.g., the second wheel set 604). Each wheel set includes a single motor (e.g., the motor 214-1 or the motor 214-2) mechanically connected to two wheels. Further, the first wheel set and the second wheel set are disposed opposite one another on opposing sides of the bottom of the line-following robot. In order to control the line-following robot, at step 2002, the plurality of line images is collected from the camera. The camera is disposed on the front of the line-following robot. For example, the camera is the OV 7670 camera. The plurality of line images may include the straight-line images, the dotted-line images, the intersecting-line images, the branched-line images, images of lines with sharp turns, images of lines with acute turns, images of lines with mild curves, images of lines with sharp curves, and the like.

At step 2004, the training image dataset is generated from the plurality of line images based on the adaptive image processing technique. Examples of the adaptive image processing techniques may include, but are not limited to, the AHE image processing technique, the Otsu's thresholding technique, the adaptive denoising image processing technique, the adaptive bilateral filtering image processing technique, the region-based segmentation image processing technique, the adaptive edge detection image processing technique, and the adaptive color correction image processing technique. In an embodiment, the training image dataset is generated to train the neural network model configured to predict the line-type of the assembly line. In other words, the neural network model is pre-trained with the plurality of line images. Examples of the neural network model may include, but are not limited to, the SVC model, the CNN model, the RNN model, the feed-forward neural network model, the deep reinforcement learning model, the GAN model, and the SOM.

Once the training image dataset is generated, the neural network model is trained based on the training image dataset and the input parameter received from the input device (e.g., the push buttons). In other words, the line-following robot further includes the input device configured to receive the input parameter from the operator and the display device (e.g., the display device 210) configured to display the status information of the line-following robot.

Once the training image dataset is generated, at step 2006, the base speed of the line-following robot based on the line-type. Further, at step 2008, the plurality of sensor data is collected from the IR sensor array. The IR sensor array is disposed on the line-following robot, and oriented in the direction of travel of the line-following robot. The IR sensor array includes the plurality of sensors facing towards the surface of the assembly line. In other words, the IR sensor array includes the plurality of IR light reflection switches evenly spaced on the arc-shaped PCB. The plurality of IR light reflection switches may correspond to the plurality of sensors. The arc-shaped printed circuit board has the diameter of curvature substantially same with the length of the line-following robot. The plurality of sensor data may include surface condition data (such as rough surface, smooth surface, light surface, dark surface, solid lines, dashed lines, etc.) associated with the surface of the assembly line to be followed by the line-following robot, position data (such as left, right, center) of the line-following robot, and the like.

Upon receiving the plurality of sensor data, at step 2010, the base position of the line-following robot is determined based on the plurality of sensor data. At step 2012, the control signal including a plurality of PWM signals is generated. In an embodiment, the control signal is generated based on the base speed, the base position, and the line-type using the PID algorithm. The control signal is configured to mitigate the positional error of the line-following robot and to adjust the motor speed of each motor of the plurality of motors. The plurality of motors includes the left motor and the right motor. Further, the positional error is estimated based on the base position. The plurality of PWM signals includes the first PWM signal and the second PWM signal. The first PWM signal is configured to adjust a left motor speed (also referred to as the speed) of the left motor. The second PWM signal is configured to adjust a right motor speed (also referred to as the speed) of the right motor. The generation of the control signal further includes detecting the finish line of the assembly line based on the plurality of sensor data and adjusting the control signal to stop the operation of the line-following robot. In other words, when the control signal is generated, the check is performed to determine whether the assembly line is the finish line or not. If the assembly line is not the finish line, the control signal is generated based on the predicted line type. If the assembly line is the finish line, the control signal to stop the operation of the line-following robot At step 2014, the speed of each motor of the plurality of motors is adjusted based on the control signal to thereby control the line-following robot. To adjust the speed of each of the plurality of motors. A motor of the plurality of motor is connected to the first wheel set and the second wheel set to control the line-following robot. The first wheel set and the second wheel set are disposed opposite one another on opposing sides of the bottom of the line-following robot. Further, each wheel set includes a single motor having a driving gear mechanically connected to a first wheel having the first driven gear and the second wheel having the second driven gear with the motor of the first wheel set coaxial with the motor of the second wheel set. In an embodiment, the first driven gear and the second driven gear have the first radius larger than the second radius of the driving gear. The driving gear, the first driven gear, and the second driven gear have the co-planar rotation and are in contact through the herringbone pattern.

Figure 21:
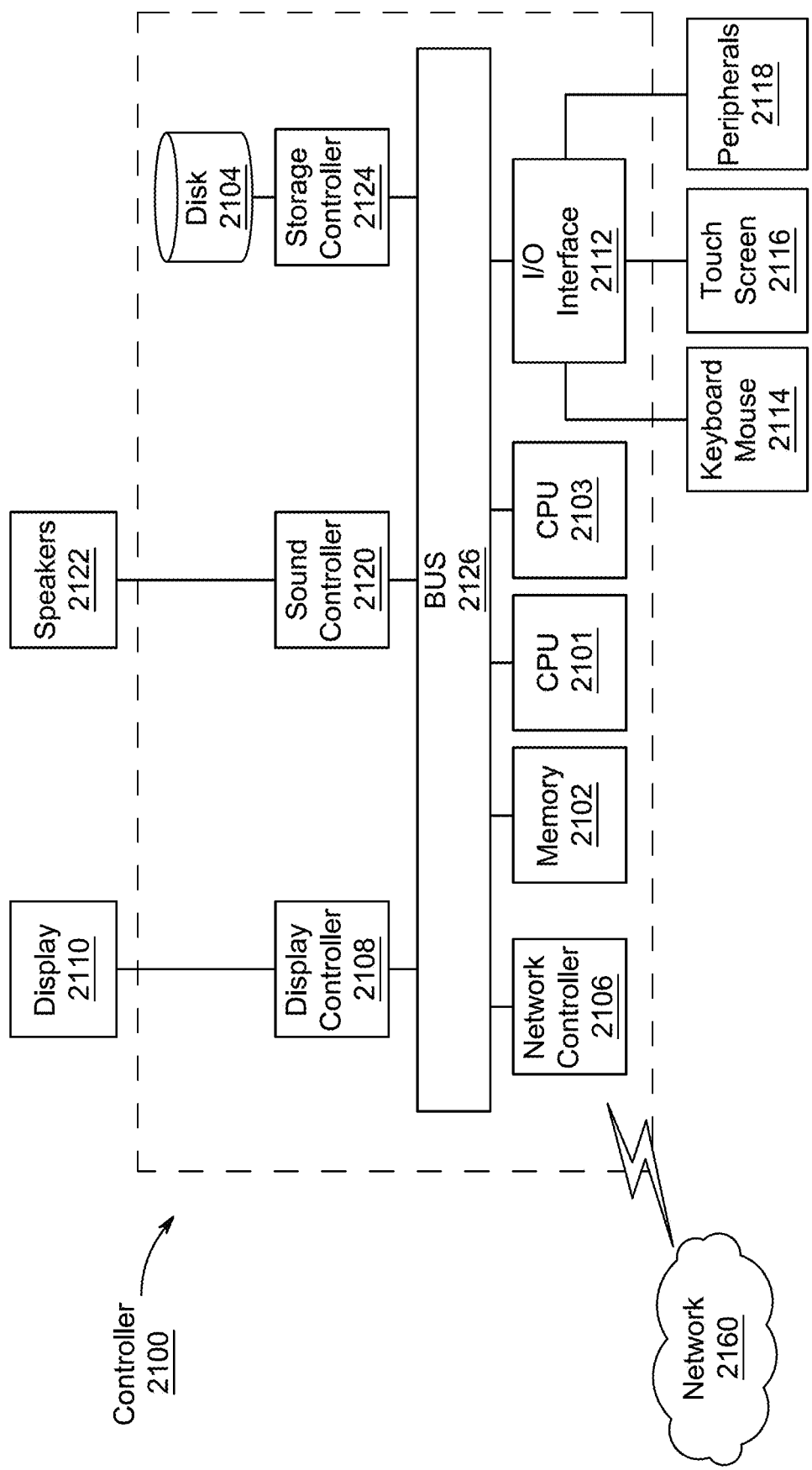
FIG. 21 is an illustration of a non-limiting example of details of computing hardware used in a microcontroller of the post processing machine and/or a remote computing device of the system, according to certain embodiments.

Next, further details of the hardware description of a computing environment according to exemplary embodiments is described with reference to FIG. 21. In FIG. 21, a controller 2100 is described is representative of the computer vision module 102, the control system module 108, etc. of the system 100, in which the controller 2100 is a computing device which includes a CPU 2101 which performs the processes described above/below. The process data and instructions may be stored in memory 2102. These processes and instructions may also be stored on a storage medium disk 2104 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 2101, 2103 and an operating system such as Microsoft Windows 7, Microsoft Windows 8, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 2101 or CPU 2103 may be a Xenon or Core processor from Intel of America or an Opteron processor from AMD of America, or may be other processor types that would be recognized by one of ordinary skill in the art. Alternatively, the CPU 2101, 2103 may be implemented on an FPGA, ASIC, or PLD or by using discrete logic circuits, as one of the ordinary skills in art would be recognition. Further, CPU 2101, 2103 may be implemented as multiple processors cooperatively working in parallel to perform the instructions of the inventive processes described above.

The computing device in FIG. 21 also includes a network controller 2106, such as an Intel Ethernet PRO network interface card from Intel Corporation of America, for interfacing with network 2160. As can be appreciated, the network 2160 can be a public network, such as the Internet, or a private network such as an LAN or WAN network, or any combination thereof and can also include PSTN or ISDN sub-networks. The network 2160 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 2108, such as a NVIDIA GeForce GTX or Quadro graphics adaptor from NVIDIA Corporation of America for interfacing with display 2110, such as a Hewlett Packard HPL2445w LCD monitor. A general purpose I/O interface 2112 interfaces with a keyboard and/or mouse 2114 as well as a touch screen panel 2116 on or separate from display 2110. General purpose I/O interface also connects to a variety of peripherals 2118 including printers and scanners, such as an OfficeJet or DeskJet from Hewlett Packard.

A sound controller 2120 is also provided in the computing device such as Sound Blaster X-Fi Titanium from Creative, to interface with speakers/microphone 2122 thereby providing sounds and/or music.

The general purpose storage controller 2124 connects the storage medium disk 2104 with communication bus 2126, which may be an ISA, EISA, VESA, PCI, or similar, for interconnecting all of the components of the computing device. A description of the general features and functionality of the display 2110, keyboard and/or mouse 2114, as well as the display controller 2108, storage controller 2124, network controller 2106, sound controller 2120, and general purpose I/O interface 2112 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 22.

Figure 22:
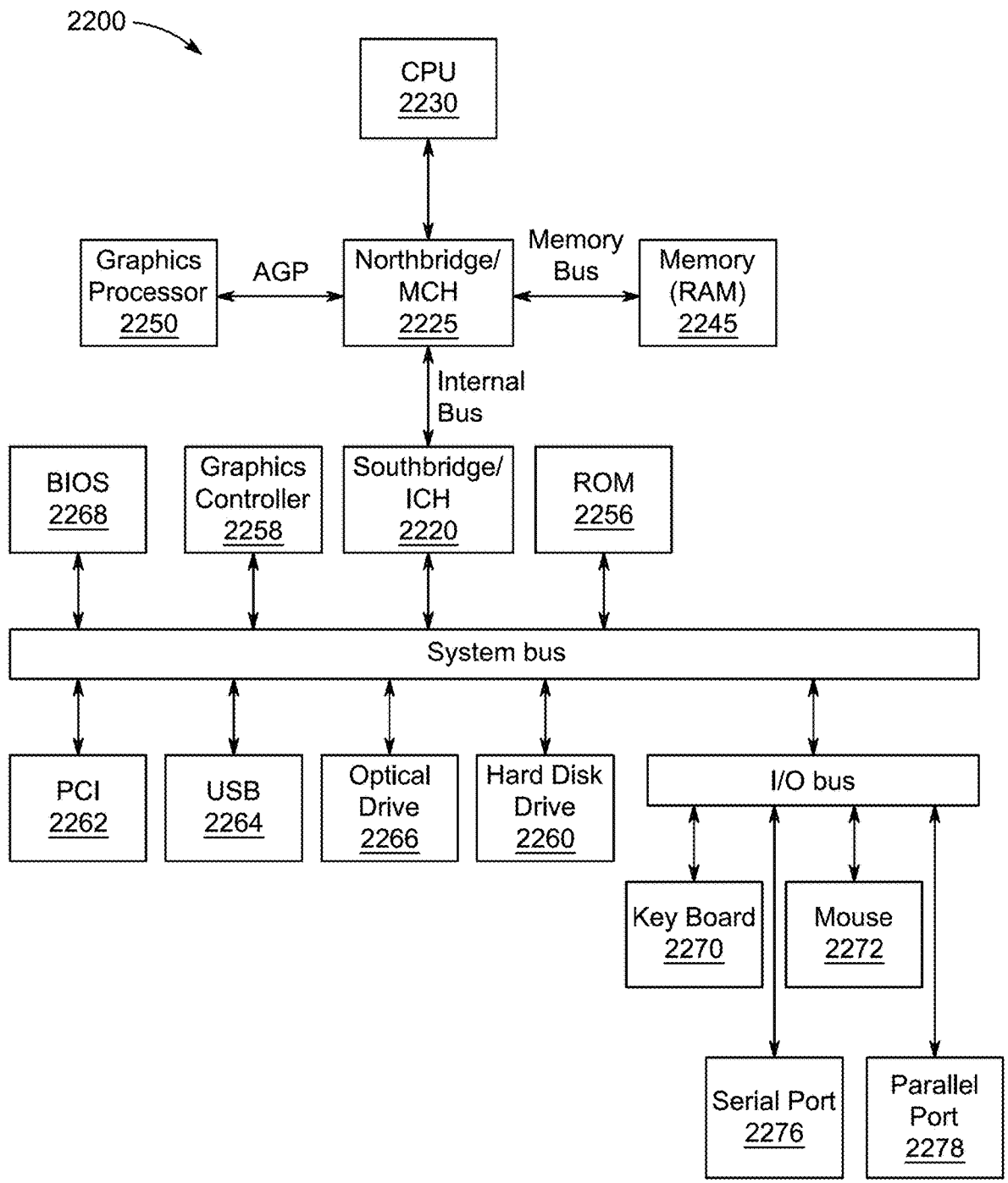
FIG. 22 is an exemplary schematic diagram of a data processing system used within the microcontroller and/or remote computing device, according to certain embodiments.

FIG. 22 shows a schematic diagram of a data processing system, according to certain embodiments, for performing the functions of the exemplary embodiments. The data processing system is an example of a computer in which code or instructions implementing the processes of the illustrative embodiments may be located.

In FIG. 22, data processing system 2200 employs a hub architecture including a north bridge and memory controller hub (NB/MCH) 2225 and a south bridge and input/output (I/O) controller hub (SB/ICH) 2220. The central processing unit (CPU) 2230 is connected to NB/MCH 2225. The NB/MCH 2225 also connects to the memory 2245 via a memory bus, and connects to the graphics processor 2250 via an accelerated graphics port (AGP). The NB/MCH 2225 also connects to the SB/ICH 2220 via an internal bus (e.g., a unified media interface or a direct media interface). The CPU Processing unit 2230 may contain one or more processors and even may be implemented using one or more heterogeneous processor systems.

Figure 23:
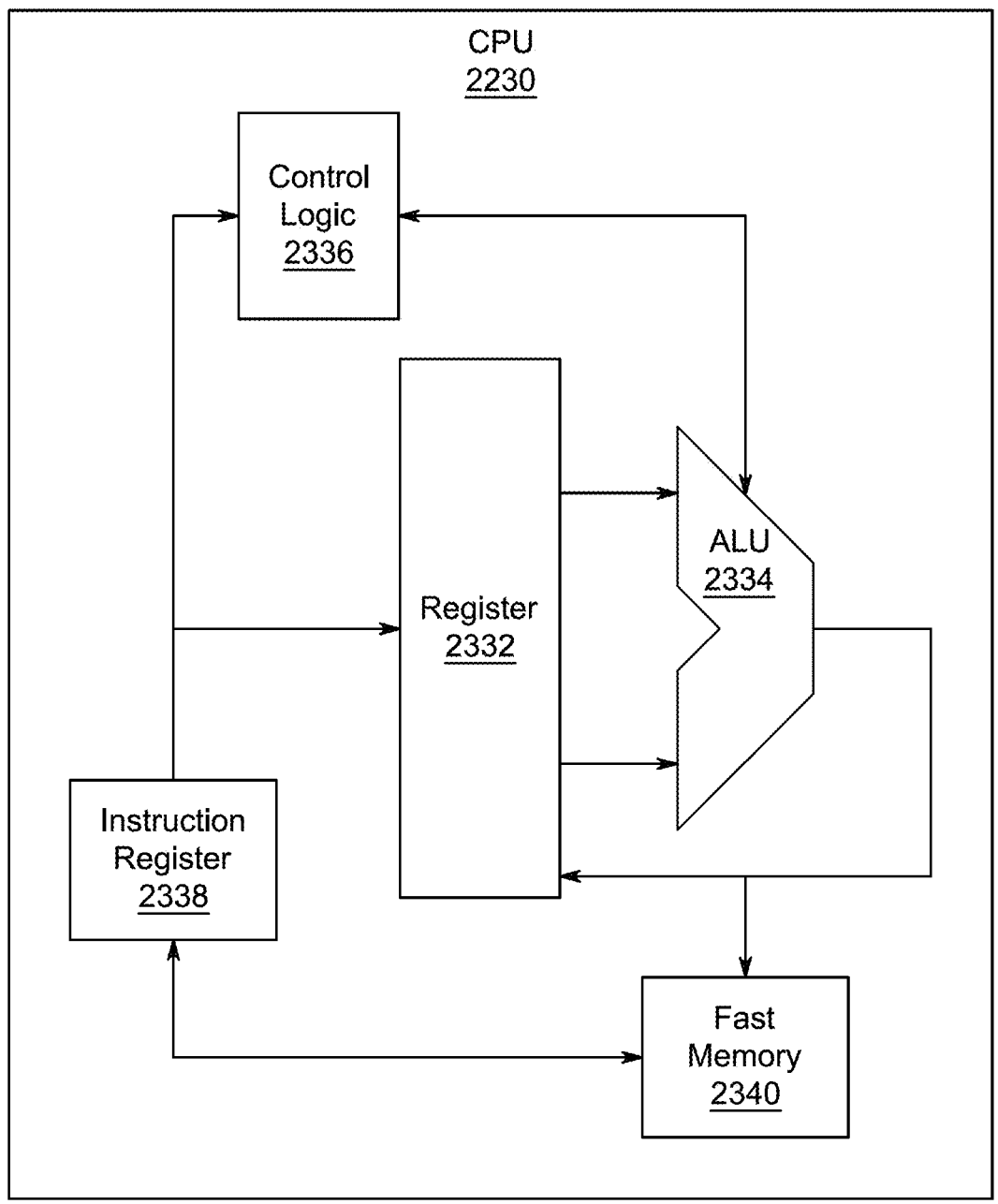
FIG. 23 is an exemplary schematic diagram of a processor used with the microcontroller and/or remote computing device, according to certain embodiments.

For example, FIG. 23 shows one implementation of CPU 2230. In one implementation, the instruction register 2338 retrieves instructions from the fast memory 2340. At least part of these instructions are fetched from the instruction register 2338 by the control logic 2336 and interpreted according to the instruction set architecture of the CPU 2230. Part of the instructions can also be directed to the register 2332. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 2334 that loads values from the register 2332 and performs logical and mathematical operations on the loaded values according to the instructions. The results from these operations can be feedback into the register and/or stored in the fast memory 2340. According to certain implementations, the instruction set architecture of the CPU 2230 can use a reduced instruction set architecture, a complex instruction set architecture, a vector processor architecture, a very large instruction word architecture. Furthermore, the CPU 2230 can be based on the Von Neuman model or the Harvard model. The CPU 2230 can be a digital signal processor, an FPGA, an ASIC, a PLA, a PLD, or a CPLD. Further, the CPU 2230 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 22, the data processing system 2200 can include that the SB/ICH 2220 is coupled through a system bus to an I/O Bus, a read only memory (ROM) 2256, universal serial bus (USB) port 2264, a flash binary input/output system (BIOS) 2268, and a graphics controller 2258. PCI/PCIe devices can also be coupled to SB/ICH 2288 through a PCI bus 2262.

The PCI devices may include, for example, Ethernet adapters, add-in cards, and PC cards for notebook computers. The Hard disk drive 2260 and CD-ROM 2266 can use, for example, an integrated drive electronics (IDE) or serial advanced technology attachment (SATA) interface. In one implementation the I/O bus can include a super I/O (SIO) device.

Further, the hard disk drive (HDD) 2260 and optical drive 2266 can also be coupled to the SB/ICH 2220 through a system bus. In one implementation, a keyboard 2270, a mouse 2272, a parallel port 2278, and a serial port 2276 can be connected to the system bus through the I/O bus. Other peripherals and devices that can be connected to the SB/ICH 2220 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 24:
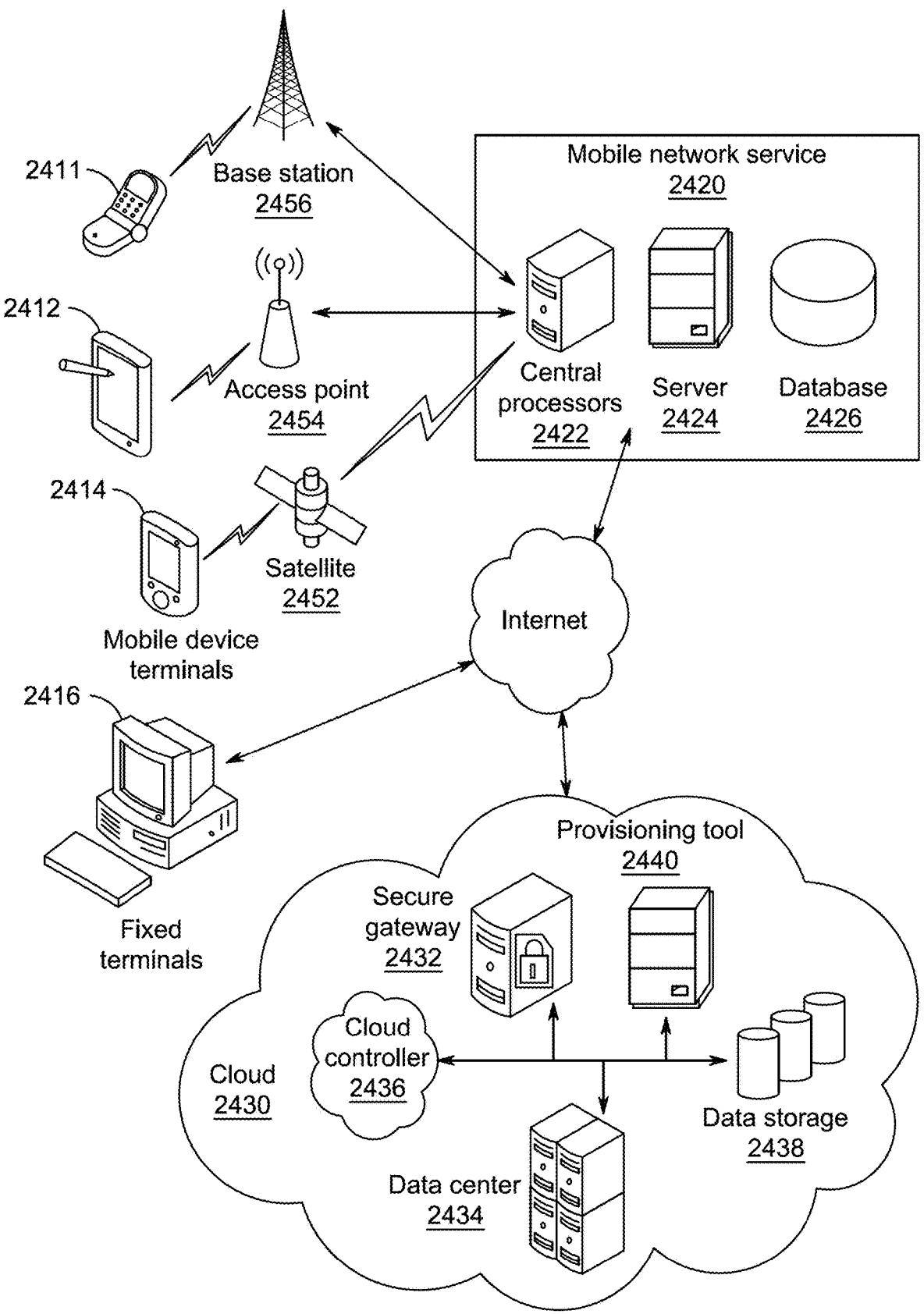
FIG. 24 is an illustration of a non-limiting example of distributed components which may share processing with the computing hardware, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 2430 including a cloud controller 2436, a secure gateway 2432, a data center 2434, data storage 2438 and a provisioning tool 2440, and mobile network services 2420 including central processors 2422, a server 2424 and a database 2426, which may share processing, as shown by FIG. 24, in addition to various human interface and communication devices (e.g., display monitors 2416, smart phones 2410, tablets 2412, personal digital assistants (PDAs) 2414). The network may be a private network, such as a LAN, satellite 2452 or WAN 2454, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A line-following robot for operation in an assembly line, comprising:
   a microcontroller;
   a camera connected to the microcontroller, disposed on a front of the line-following robot, and configured to collect a plurality of line images;
   an Infrared (IR) sensor array connected to the microcontroller, disposed on the line-following robot, and oriented in a direction of travel of the line-following robot, wherein the IR sensor array comprises a plurality of sensors facing towards a surface of the assembly line;
   a first wheel set and a second wheel set,
   wherein the first wheel set and the second wheel set are disposed opposite one another on opposing sides of a bottom of the line-following robot,
   wherein each wheel set comprises a single motor having a driving gear mechanically connected to a first wheel having a first driven gear and a second wheel having a second driven gear with a motor of the first wheel set coaxial with a motor of the second wheel set,
   wherein the first driven gear and the second driven gear have a first radius larger than a second radius of the driving gear, and
   wherein the driving gear, the first driven gear, and the second driven gear have a co-planar rotation and are in contact through a herringbone pattern; and
   a battery, wherein the microcontroller includes program instructions configured to:
  generate a training image data set from the plurality of line images based on an adaptive image processing technique to train a neural network model configured to predict a line-type of the assembly line;
  calculate a base speed of the line-following robot based on the line-type;
  calculate a base position of the line-following robot based on the plurality of sensor data;
  generate a control signal comprising a plurality of Pulse-Width Modulation (PWM) signals based on the base speed, the base position, and the line-type using a Proportional-Integral-Derivative (PID) algorithm, wherein the control signal is configured to mitigate a positional error of the line-following robot and to adjust a motor speed of each motor of the plurality of motors and wherein the positional error is estimated based on the base position; and
  adjust the speed of each motor of the plurality of motors based on the control signal to thereby control the line-following robot.

2. The line-following robot of claim 1, wherein the neural network model is pre-trained with the plurality of line images.

3. The line-following robot of claim 1, wherein the microcontroller is further configured to:
  detect a finish line of the assembly line based on the plurality of sensor data; and
  adjust the control signal to stop an operation of the line-following robot.

4. The line-following robot of claim 1, wherein the plurality of sensors includes a plurality of IR light reflection switches evenly spaced on an arc-shaped printed circuit board, wherein the arc-shaped printed circuit board have a diameter of curvature substantially same with a length of the line-following robot.

5. The line-following robot of claim 1, wherein the line-following robot further has an input device configured to receive an input parameter from an operator and a display device configured to display a status information of the line-following robot.

6. The line-following robot of claim 5, wherein the neural network model is trained further based on the input parameter received from the input device.

7. The line-following robot of claim 1, wherein the plurality of PWM signals comprises a first PWM signal and a second PWM signal,
  wherein the plurality of motors comprises a left motor and a right motor,
  wherein the first PWM signal is configured to adjust a left motor speed of the left motor, and
  wherein the second PWM signal is configured to adjust a right motor speed of the right motor.

8. The line-following robot of claim 7, wherein the base speed is calculated further based on the surface friction, the base position, and an angle of inclination of the assembly line at the base position.

9. A method of controlling a line-following robot in an assembly line, wherein the line-following robot has a microcontroller, a camera, an Infrared (IR) sensor array, a first wheel set and a second wheel set, each wheel set comprising a single motor mechanically connected to two wheels, the first wheel set and the second wheel set are disposed opposite one another on opposing sides of a bottom of the line-following robot, comprising:
  collecting a plurality of line images from the camera disposed on a front of the line-following robot;
  generating a training image data set from the plurality of line images based on an adaptive image processing technique to train a neural network model configured to predict a line-type of the assembly line;
  calculating a base speed of the line-following robot based on the line-type;
  collecting a plurality of sensor data from the IR sensor array, wherein the IR sensor array is disposed on the line-following robot, and oriented in a direction of travel of the line-following robot, wherein the IR sensor array comprises a plurality of sensors facing towards a surface of the assembly line;
  calculating a base position of the line-following robot based on the plurality of sensor data;
  generating a control signal comprising a plurality of Pulse-Width Modulation (PWM) signals based on the base speed, the base position, and the line-type using a Proportional-Integral-Derivative (PID) algorithm, wherein the control signal is configured to mitigate a positional error of the line-following robot and to adjust a motor speed of each motor of the plurality of motors and wherein the positional error is estimated based on the base position; and
  adjusting the speed of each motor of the plurality of motors based on the control signal to thereby control the line-following robot,
  wherein the first wheel set and second wheel set are disposed opposite one another on opposing sides of a bottom of the line-following robot,
  wherein each wheel set comprises a single motor having a driving gear mechanically connected to a first wheel having a first driven gear and a second wheel having a second driven gear with a motor of the first wheel set coaxial with a motor of the second wheel set,
  wherein the first driven gear and the second driven gear have a first radius larger than a second radius of the driving gear, and
  wherein the driving gear, the first driven gear, and the second driven gear have a co-planar rotation and are in contact through a herringbone pattern.

10. The method of claim 9, wherein the neural network model is pre-trained with the plurality of line images.

11. The method of claim 9, wherein the generating further comprises:
  detecting a finish line of the assembly line based on the plurality of sensor data; and
  adjusting the control signal to stop an operation of the line-following robot.

12. The method of claim 9, wherein the IR sensor array comprises a plurality of IR light reflection switches evenly spaced on an arc-shaped Printed Circuit Board (PCB), wherein the arc-shaped PCB have a diameter of curvature substantially same with a length of the line-following robot.

13. The method of claim 9, wherein the line-following robot further has an input device configured to receive an input parameter from an operator and a display device configured to display a status information of the line-following robot.

14. The method of claim 13, wherein the generating the training image data set further comprises training the neural network model based on the training image data set and the input parameter received from the input device.

15. The method of claim 9, wherein the plurality of PWM signals comprises a first PWM signal and a second PWM signal, wherein the plurality of motors comprises a left motor and a right motor, wherein the first PWM signal is configured to adjust a left motor speed of the left motor, and wherein the second PWM signal is configured to adjust a right motor speed of the right motor.

16. The method of claim 15, wherein the base speed is calculated further based on the surface friction, the base position, and an angle of inclination of the assembly line at the base position.

* * * * *